(12) United States Patent
Fukasawa

(10) Patent No.: US 7,971,212 B2
(45) Date of Patent: Jun. 28, 2011

(54) DISK LOADING MECHANISM AND DISK DEVICE

(75) Inventor: Akihiro Fukasawa, Kyoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 817 days.

(21) Appl. No.: 11/921,941

(22) PCT Filed: Apr. 5, 2006

(86) PCT No.: PCT/JP2006/307195
§ 371 (c)(1),
(2), (4) Date: Dec. 11, 2007

(87) PCT Pub. No.: WO2007/032113
PCT Pub. Date: Mar. 22, 2007

(65) Prior Publication Data
US 2009/0089819 A1    Apr. 2, 2009

(30) Foreign Application Priority Data

Sep. 13, 2005   (JP) ................. 2005-265055

(51) Int. Cl.
*G11B 17/04*     (2006.01)
*G11B 17/051*    (2006.01)
(52) U.S. Cl. ..................................... 720/623
(58) Field of Classification Search ............... 720/622, 720/623, 626, 632, 633, 656, 619, 620, 634, 720/635
See application file for complete search history.

(56) References Cited

U.S. PATENT DOCUMENTS
2001/0021157 A1*  9/2001  Kikuchi et al. ............. 369/77.1
2004/0218481 A1   11/2004 Makisaka et al.

FOREIGN PATENT DOCUMENTS
| JP | 2955116 B2    | 7/1999 |
| JP | 2004-246970 A | 9/2004 |
| JP | 2005-251362 A | 9/2005 |
| JP | 2006-127680 A | 5/2006 |
| JP | 2006-172542 A | 5/2006 |
| JP | 2006-172557 A | 6/2006 |

* cited by examiner

Primary Examiner — Craig A. Renner
Assistant Examiner — Tamara Ashford
(74) Attorney, Agent, or Firm — Birch, Stewart, Kolasch & Birch, LLP

(57) ABSTRACT

A disk stopper (101) for regulating a loading position of the disk stopper, a stopper regulating member (102) that regulates a movable range of the disk stopper (101), and a link member (103) movable in association with the stopper regulating member (102), and a cam slider (30) engageable with the link member (103) are provided. When a small-diameter disk is inserted, the first engaging portion of the link member (103) and the first engaging portion of the cam slide (30) engage each other. When a large-diameter disk is inserted, the second engaging portion of the link member (103) and the second engaging portion of the cam slide (30) engage each other. Based on the engaging condition of the link member (103) and the cam slider (30), the stopper regulating member (102) switches the loading position of the disk medium regulated by the disk stopper (101).

9 Claims, 20 Drawing Sheets

DISK LOADING MECHANISM AND DISK DEVICE

TECHNICAL FIELD

This invention relates to a disk device configured to directly load and unload a disk medium such as such as CD (Compact Disk), DVD (Digital Versatile Disk) or the like, and relates to a disk loading mechanism thereof.

BACKGROUND ART

Conventionally, a disk device of a so-called slot-in type is configured to directly load and unload a disk medium without placing the disk medium on a tray. A disk stopper is provided in the disk device of this type, and the disk stopper abuts against the peripheral edge of the disk medium to regulate the loading position of the disk medium. Recently, in order to correspond to a plurality of kinds of disk media of different diameters, the disk stopper is configured to be reciprocally movable in the loading-unloading direction (for example, see Patent Document No. 1).

When the disk medium is loaded into the disk device, the disk stopper moves to a predetermined position corresponding to the diameter of the disk medium, and abuts against the peripheral edge of the disk medium, so as to position the disk medium. Further, when the positioning the disk medium is completed, the disk stopper departs from the disk.

Patent Document No. 1: Japanese Patent Publication No. 2955116 (Pages 4-5, FIGS. 1-3).

DISCLOSURE OF THE INVENTION

Problems to be Solved by the Invention

However, in order to drive the disk stopper, the above descried conventional disk device needs a number of components such as a front arm, a front arm spring, a disk stopper, a stopper arm, a stopper arm spring, a lock arm, a lock arm spring and a rack gear. Therefore, there is a problem that the manufacturing cost of the disk stopper is expensive. Further, due to the large number of components, there is a possibility that the structure may become complicated, and a resulting defect may occur.

The present invention is intended to solve the above described problems, and an object of the present invention is to provide a disk device and a loading mechanism thereof capable of corresponding to optical disks of different diameters, having a small number of components and having a simple structure.

Means of Solving the Problems

A disk device according to the present invention includes a feeding mechanism capable of loading and unloading disk media of different diameters into and from a disk device, a disk stopper provided to be movable in a loading-unloading direction of the disk medium and regulating a loading position of the disk medium by abutting against the disk medium, a stopper regulating member that regulates a movable range of the disk stopper, a link member movable in association with the stopper regulating member, having a disk abutting portion pushed by a disk medium of a predetermined diameter to shift and further having first and second engaging portions, a cam slider having a first engaging portion that engages the first engaging portion of the link member in a state where the disk abutting portion is not pushed, and a second engaging portion that engages the second engaging portion of the link member in a state where the disk abutting portion is pushed. The stopper regulating member switches between loading positions regulated by the disk stopper according to when the first engaging portion of the link member and the first engaging portion of the cam slider engage each other, and when the second engaging portion of the link member and the second engaging portion of the cam slider engage each other.

Effect of the Invention

According to the disk device of the present invention, the engaging condition is switched based on whether the disk medium is disk abutting portion of the link member or not, based on which the loading position of the disk medium regulated by the disk stopper is switched. Therefore, with a simple structure, the positioning of the disk medium is automatically performed. Since it is not necessary to use a large number of components as the conventional disk device, the structure is simple, and the manufacturing cost is inexpensive. Further, it becomes possible to prevent a defect due to complexity in structure.

DESCRIPTION OF REFERENCE MARKS

1 . . . disk device, 9 . . . cover chassis, 11 . . . main chassis, 30 . . . cam slider, 30m . . . first engaging portion, 30k . . . second engaging portion, 101 . . . disk stopper, 102 . . . stopper arm, 103 . . . link member, 103b . . . disk abutting portion, 103d . . . first boss, 104 . . . coil spring, 51 . . . traverse chassis, 52 . . . turntable.

BEST MODE FOR CARRYING OUT THE INVENTION

Embodiment 1

The structure and operation of a disk device according to Embodiment 1 of the present invention will be described with reference to FIGS. 1 through 19.

<Entire Structure of Device>

Figure 1:
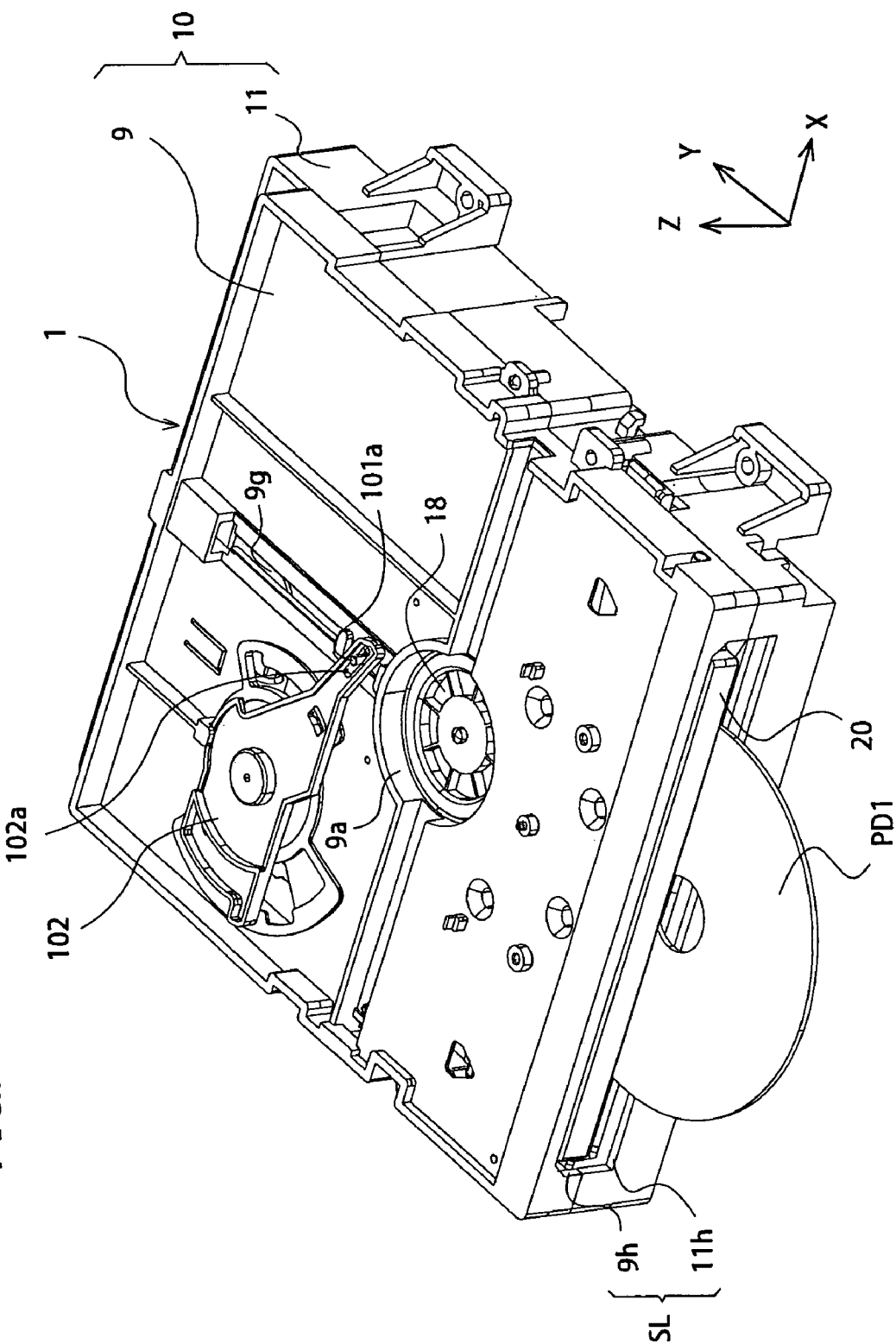
FIG. 1 is a perspective view showing a state before an optical disk of 8 cm in diameter is loaded into a disk device according to Embodiment 1 of the present invention.
Figure 2:
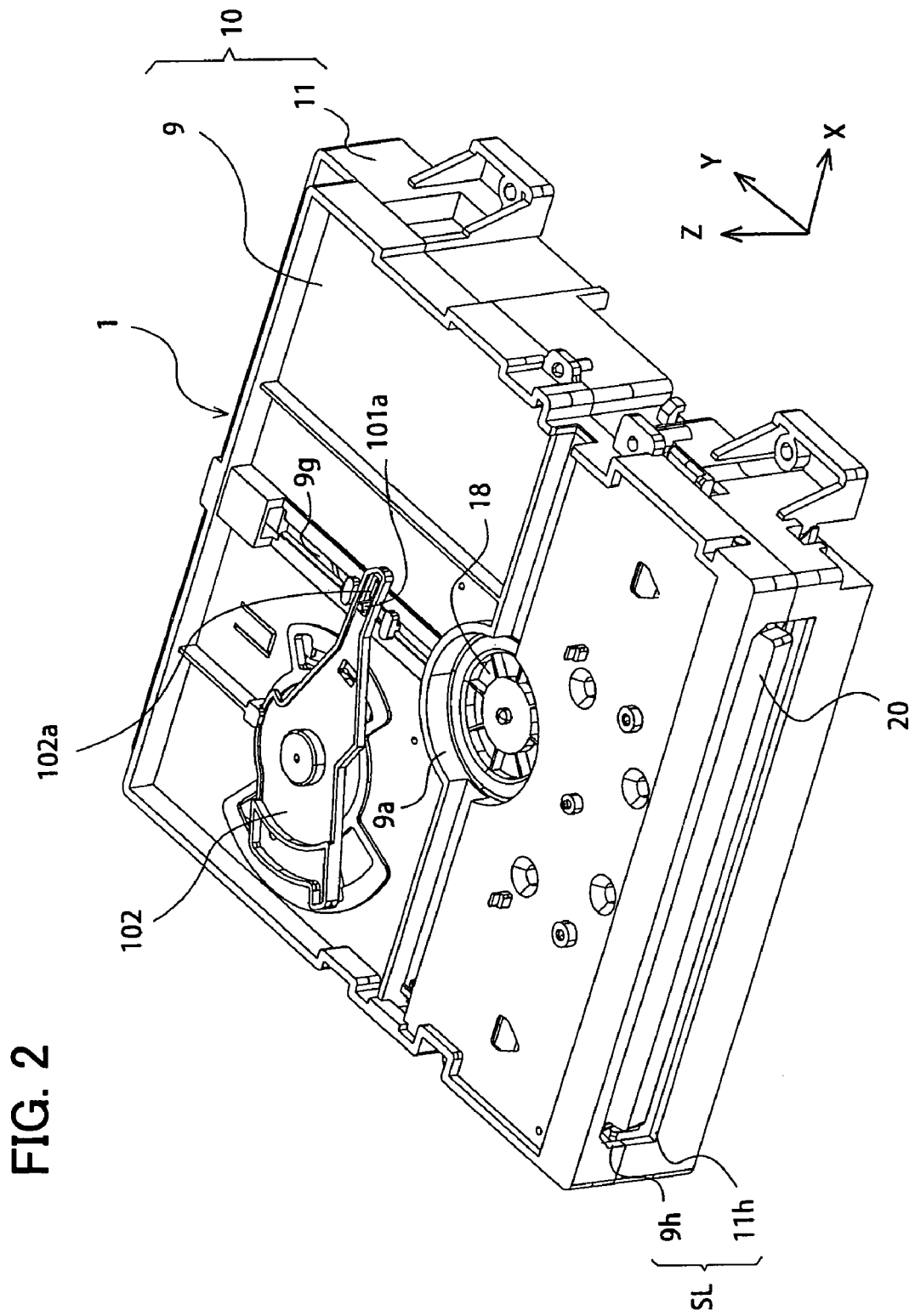
FIG. 2 is a perspective view showing a state when the optical disk of 8 cm in diameter is loaded into the disk device according to Embodiment 1 of the present invention.
Figure 3:
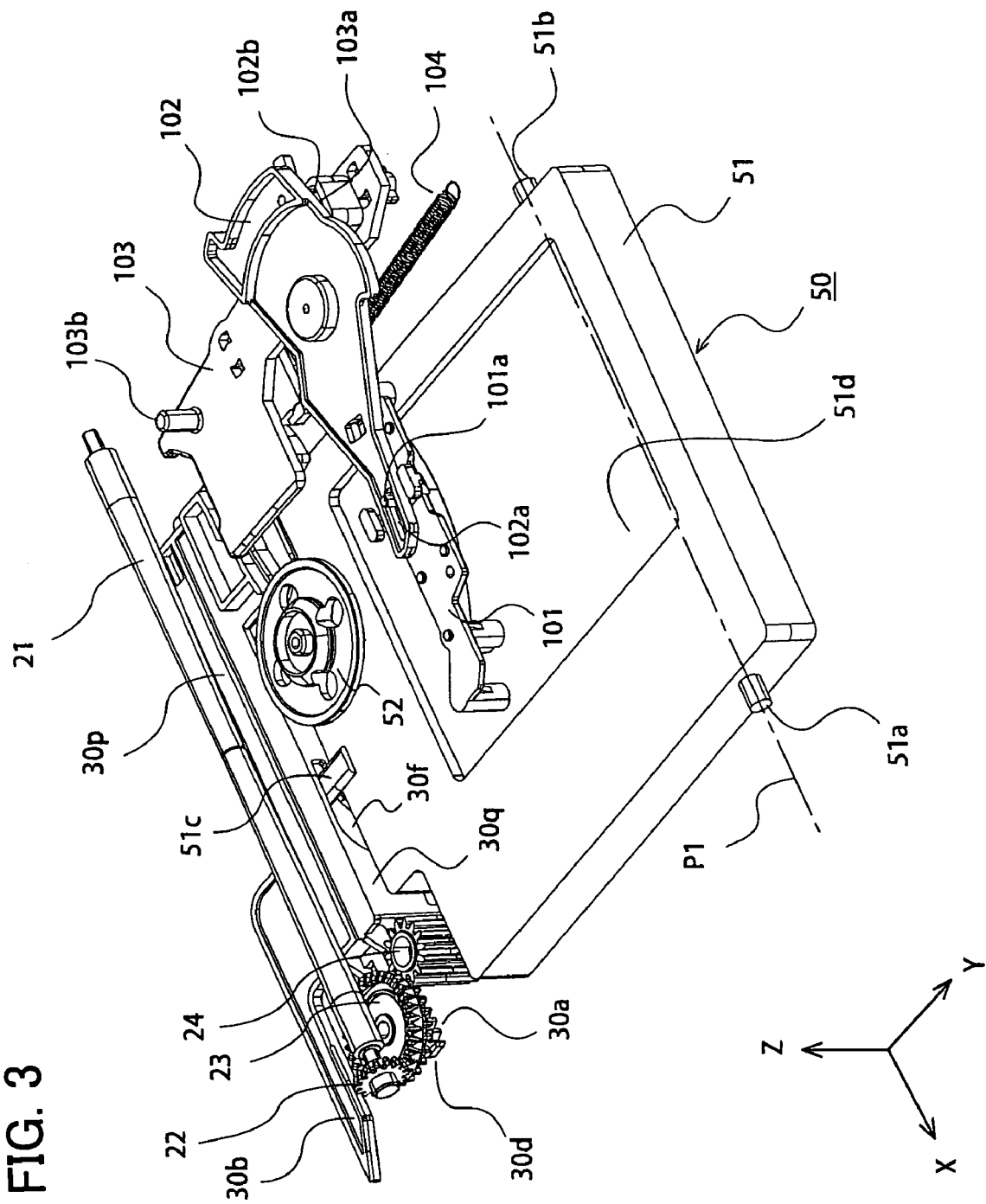
FIG. 3 is a perspective view showing main components in the disk device according to Embodiment 1 of the present invention.

FIGS. 1 and 2 are perspective views showing an external structure of the disk device 1 as seen obliquely from above. FIG. 1 shows a state while an optical disk PD1 of 8 cm in diameter is being loaded into a disk device 1. FIG. 2 shows a state where the optical disk PD1 of 8 cm in diameter has been loaded into the disk device 1. FIG. 3 is a perspective view showing main components in the disk device 1.

Hereinafter, for convenience of description, the direction parallel to the loading-unloading direction of the optical disk (a disk medium) is defined as Y direction. In a recording surface (a main surface) of the optical disk, the direction perpendicular to the above described Y direction is defined as X direction. The direction perpendicular to the recording surface of the optical disk is defined as Z direction. Along the Y direction, the loading direction of the optical disk is defined as +Y direction, and the unloading direction of the optical disk is defined as −Y direction. Along the X direction, the right side facing the +Y direction is defined as +X direction, the left side facing the +Y direction is defined as −X direction. Along the Z direction, the label surface side (the upper side) of the optical disk is defined as +Z direction, and the recording surface side (the lower side) is defined as −Z direction.

As shown in FIG. 1, the disk device 1 includes a base body 10 composed of a main chassis 11 and a cover chassis 9 which is an upper cover of the main chassis 11. On a side surface of the base body 10 (the end surface in the −Y direction), a disk insertion/ejection opening SL in the form of a slot is formed, which is configured to allow the insertion and ejection of the optical disk.

The disk insertion/ejection opening SL is a rectangular opening having longer sides in the X direction and shorter sides in the Z direction. The disk insertion/ejection opening SL is formed by combining an opening 11h formed on the main chassis 11 and an opening 9h formed on the cover chassis 9. A holding plate (called as a flap 20) for the optical disk is provided on the opening 9h side with respect to the disk insertion/ejection opening SL.

The flap 20 is a plate-like member having an elongated rectangular shape. The flap 20 is inserted in the disk insertion/ejection opening SL so that the longitudinal direction of the flap 20 is aligned with the longitudinal direction (the X direction) of the insertion/ejection opening SL. The flap 20 is supported by the cover chassis 9 so that the flap 20 is rotatable about a rotation axis of X direction. The flap 20 is configured to hold the optical disk between an end portion in the loading direction (+Y direction) and a feeding roller 21 (FIG. 3) described later.

When the optical disk is not inserted, or when the optical disk is being loaded or unloaded, the plate surface of the flap 20 is almost parallel to the recording surface of the optical disk. In contrast, when the optical disk is inserted, as shown in FIG. 2, the plate surface of the flap 20 is inclined with respect to the recording surface of the optical disk. When the plate surface of the flap 20 is inclined with respect to the recording surface of the optical disk as shown in FIG. 2, the swinging end portion of the flap 20 moves downward (shifts in the −Z direction), so as to prevent the mistaken insertion of the optical disk through the disk insertion/ejection opening SL.

A cylindrical clamper housing portion 9a is provided on the upper surface of the cover chassis 9 (a surface of the +Z direction) on a position slightly on the disk insertion/ejection opening SL side with respect to the center. A clamper 18 for holding the optical disk is rotatably provided in the clamper housing portion 9a.

The clamper 18 is mounted on the upper side (+Z side) of the movable range of the optical disk so that the clamper 18 does not interfere with the optical disk reciprocally moving in the Y direction. A magnet is housed in the claimer 18. The magnet and a turntable 52 (FIG. 3) described later attract each other, so as to hold the optical disk between the clamper 18 and the turntable 52.

A disk stopper 101 is disposed on the lower side (−Z side) of the cover chassis 9 as shown in FIG. 3. The disk stopper 101 is disposed so that the disk stopper 101 abuts against the peripheral edge of the optical disk when the optical disk is loaded into the disk device 1. The disk stopper 101 is configured to be movable, and has an initial position in the vicinity of the turntable 52. The disk stopper 101 is guided by a groove portion 9g (FIGS. 1 and 2) extending in the +Y direction from the clamper housing portion 9a in the center of the cover chassis 9 in the X direction, and reciprocally moves in the Y direction. The detail of the structure of the disk stopper 101 will be described later.

As shown in FIGS. 1 and 2, an elongated stopper arm (a stopper regulating member) 102 is swingably provided on the left end portion (the end portion in the −X direction) on the upper surface of the cover chassis 9. The stopper arm 102 has a shape such that an end portion (referred to as a tip end portion) in the axial direction has a width enormously narrower than the other end portion (referred to as a tail end portion). A slit 102a is formed on the tip end portion of the stopper arm 102, and extends in the longitudinal direction of the stopper arm 102. A boss portion 102b (see FIGS. 3 and 11) is formed on the tail end portion of the stopper arm 102, and extends in the −Z direction.

The slit 102a of the tip end portion of the stopper arm 102 engages a boss portion 101a (see FIG. 9) penetrating the groove portion 9g of the cover chassis 9 and projecting in the Z direction. With this, when the disk stopper 101 moves along the groove portion 9g, the stopper arm 102 moves in association with the disk stopper 101.

As shown in FIG. 3, the boss portion 102b of the stopper arm 102 engages an opening 103a of a link member 103 mounted to the main chassis 11. The link member 103 is urged by a coil spring (a resilient member) 104 in the +Y direction, i.e., in the direction in which the disk stopper 101 is pushed back toward the initial position.

In a state shown in FIG. 1, the optical disk PD1 is not loaded into the disk device 1, and the disk stopper 101 is in the initial position. In contrast, when the optical disk PD1 is loaded into the disk device 1, the disk stopper 101 is pushed by the optical disk PD1 to move in the loading direction (+Y direction) as can be understood from the position of the slit 102a. According to the movement of the disk stopper 101 in the loading direction, the stopper arm 102 rotates, and the link member 103 (FIG. 3) engaging the boss portion 102b of the stopper arm 102 moves in the −Y direction resisting the resilient force of the coil spring 104 (FIG. 3).

As shown in FIG. 3, a traverse unit 50 is swingably supported in the main chassis 11 (FIG. 1). The traverse unit 50 has a traverse chassis 51 (as a base body) which is a rectangular frame-like member. The traverse chassis 51 has a pair of boss portions 51a and 51b at the end portion thereof in the loading direction (+Y direction) of the optical disk, and the boss portions 51a and 51b engage the shaft receiving portions (not shown) of the main chassis 11. With this, the traverse chassis 51 is swingable in the main chassis 11 about a swinging axis P1 in the X direction defined by the boss portions 51a and 51b.

Since the traverse chassis 51 swings about the swinging axis P1 as above, the end portion of the traverse chassis 51 in the unloading direction (−Y direction) of the optical disk is referred to as a swinging end portion. The traverse chassis 51 is configured to swing so as to vertically move a turntable 52 descried below.

The turntable 52 is provided in the vicinity of the swinging end portion of the traverse chassis 51. The turntable 52 is composed of a material such as iron having the property of being attracted by a magnet, or includes a component therein composed of such a material. The turntable 52 is configured to hold the optical disk between the turntable 52 and the clamper 18 (FIG. 1). The turntable 52 is rotated by a driving force of a not shown spindle motor (a disk driving mechanism) together with the optical disk, in a state where the turntable 52 and the clamper 18 hold the optical disk therebetween.

Further, an optical pickup (not shown) for recording signals on the optical disk or reproducing signals recorded on the optical disk is disposed in an opening 51d of the traverse chassis 51. The optical pickup is reciprocally movable in the radial direction of the optical disk by means of a feed motor (not shown) as a driving source.

A feeding roller 21 that rotates about an axis of the X direction for feeding the optical disk, a roller gear 22 fixed to an end of the feeding roller 21, a transmission gear 23 engaging the roller gear 22, and a driving gear 24 engaging the transmission gear 23 are respectively rotatably supported on the main chassis (FIG. 1). The driving gear 24 is driven by a not shown loading motor and a group of gears.

<Structures of Cam Slider 30 and Link member 103>

Figure 4:
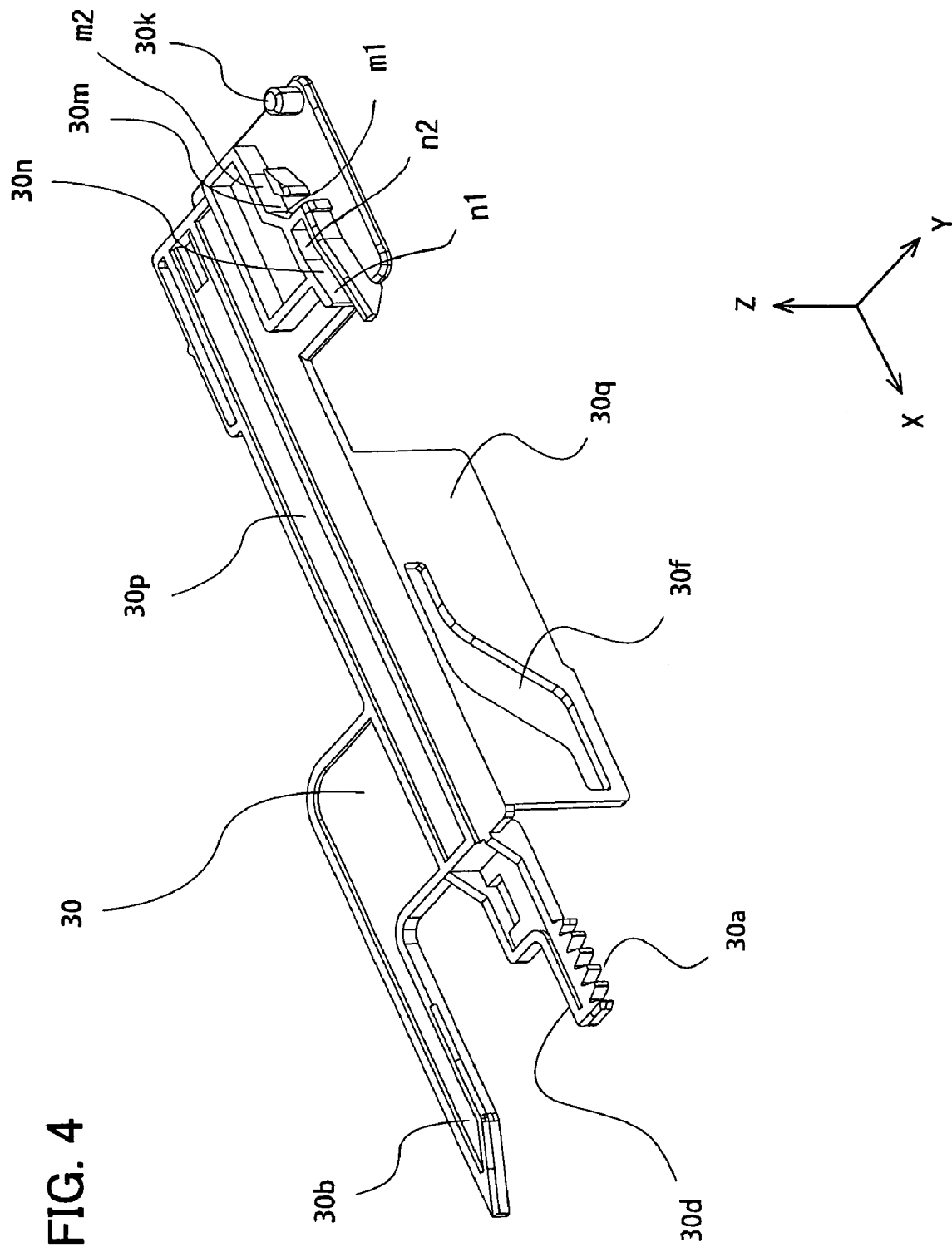
FIG. 4 is a perspective view showing the structure of a cam slider.
Figure 5:
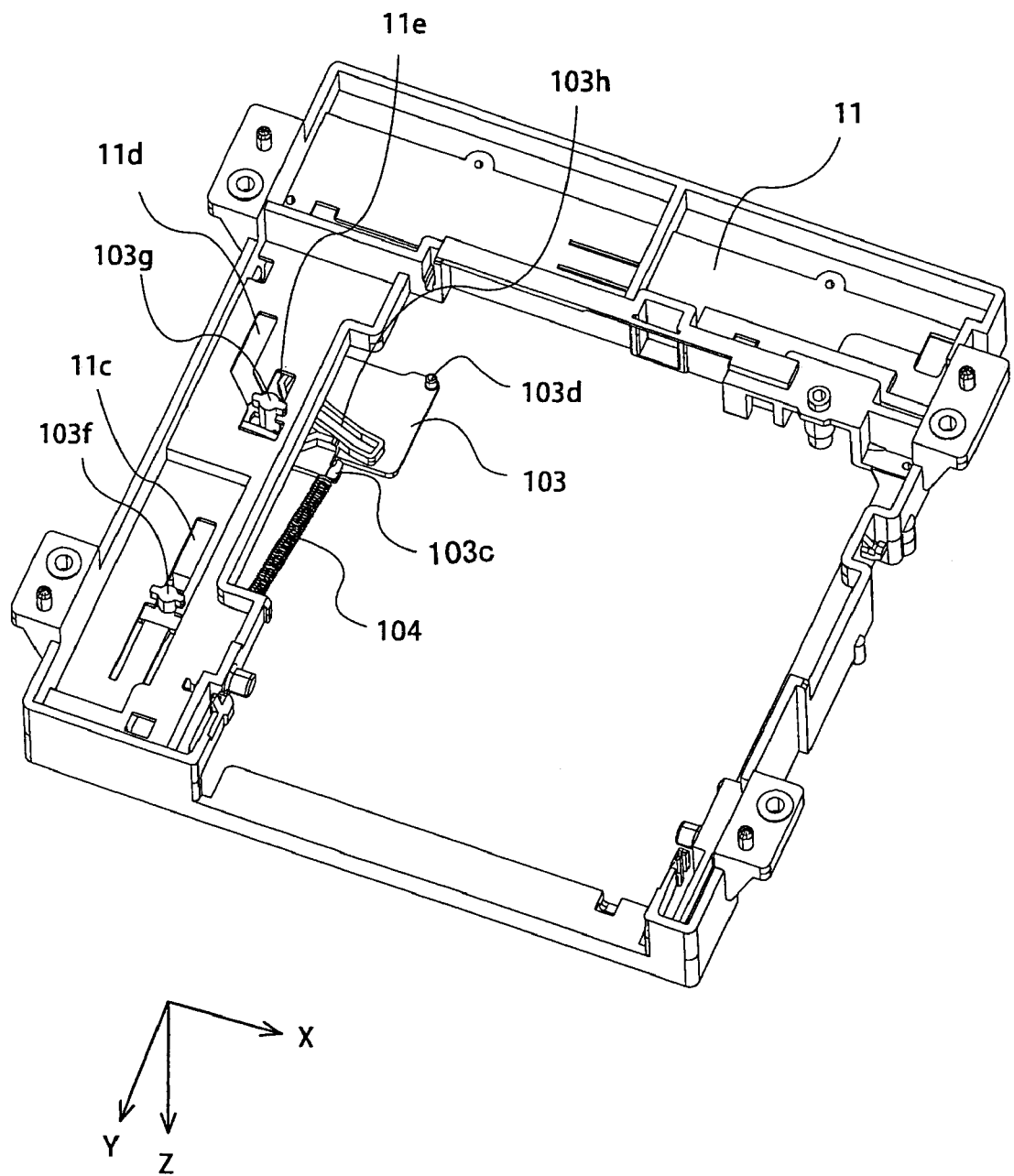
FIG. 5 is a perspective view showing a state where a link member is mounted to a main chassis.
Figure 6:
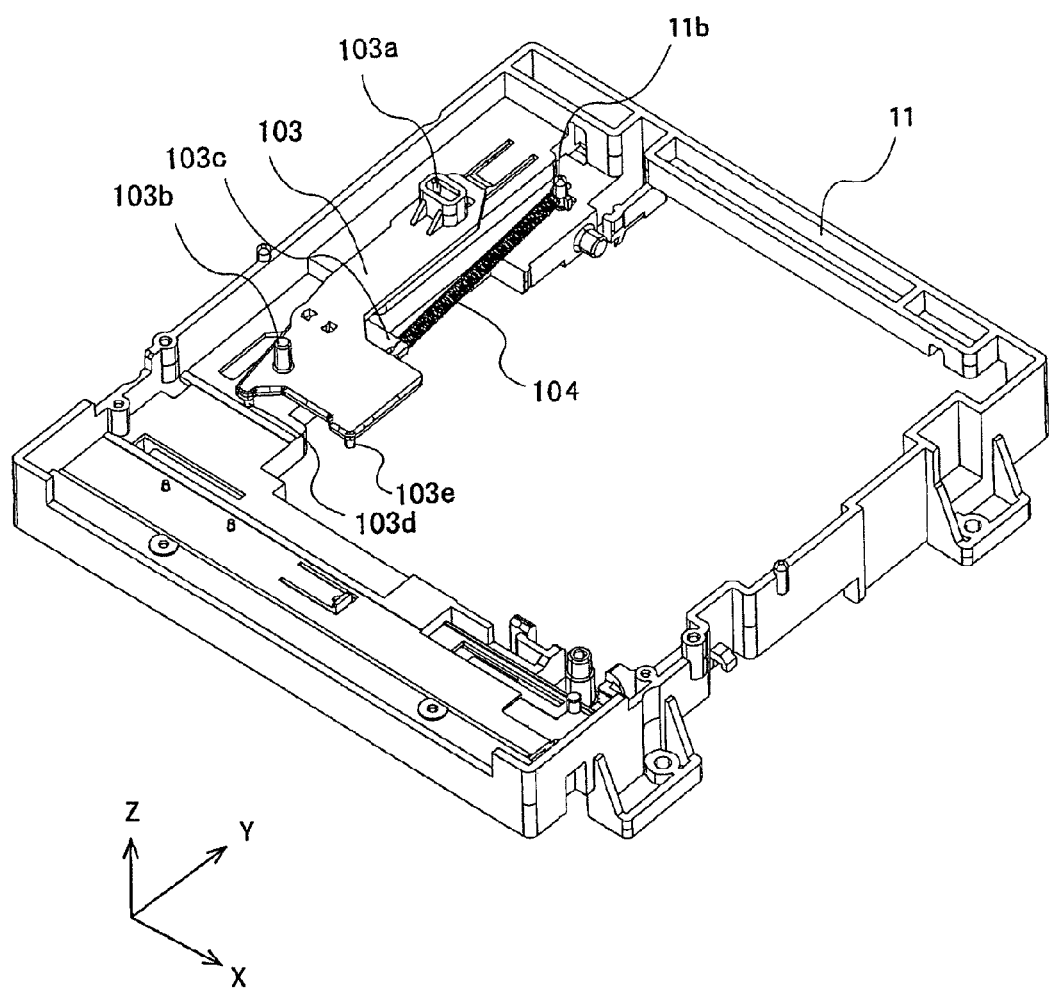
FIG. 6 is a perspective view showing the state where the link member is mounted to the main chassis.
Figure 7:
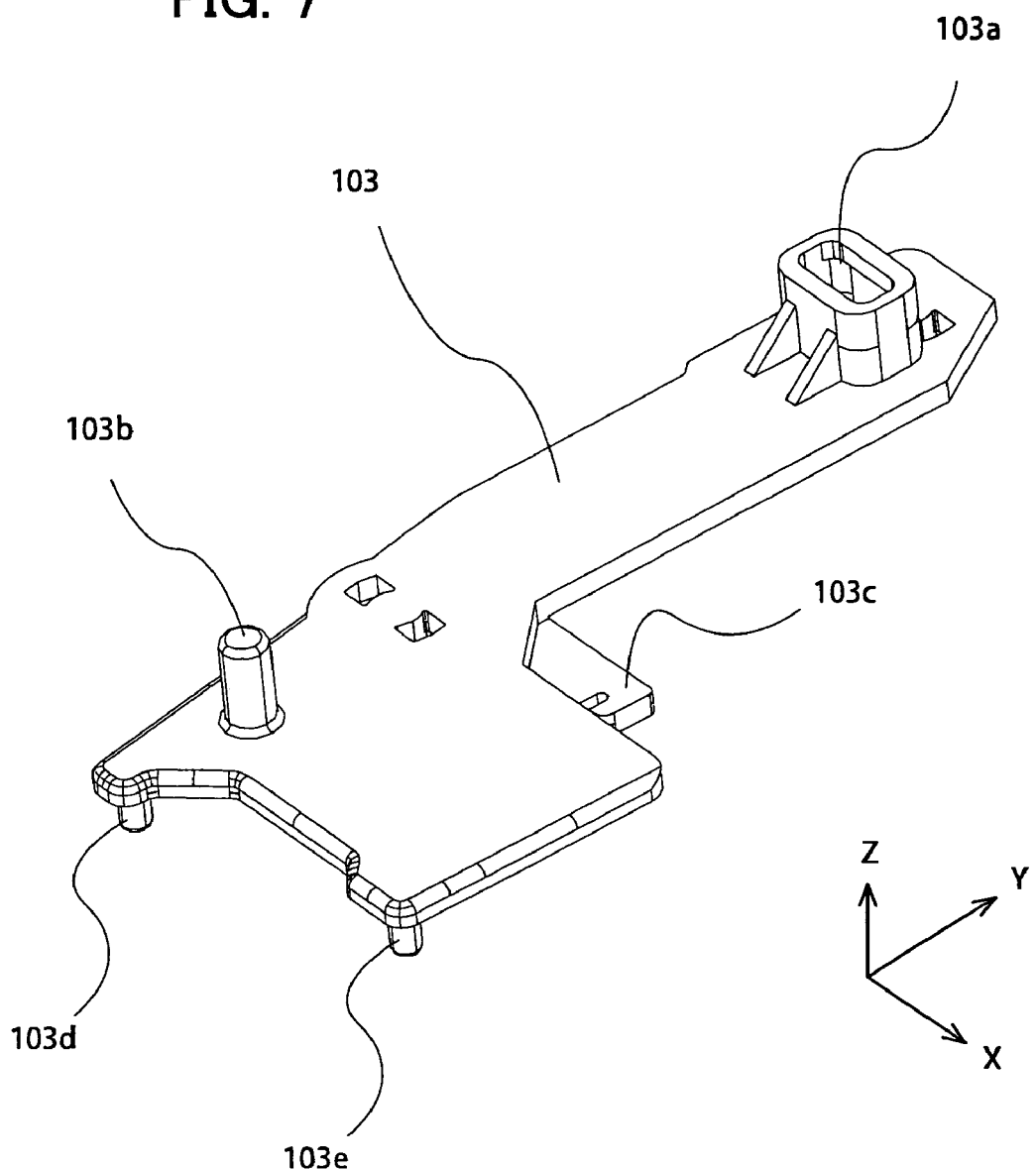
FIG. 7 is a perspective view showing the structure of the link member.
Figure 8:
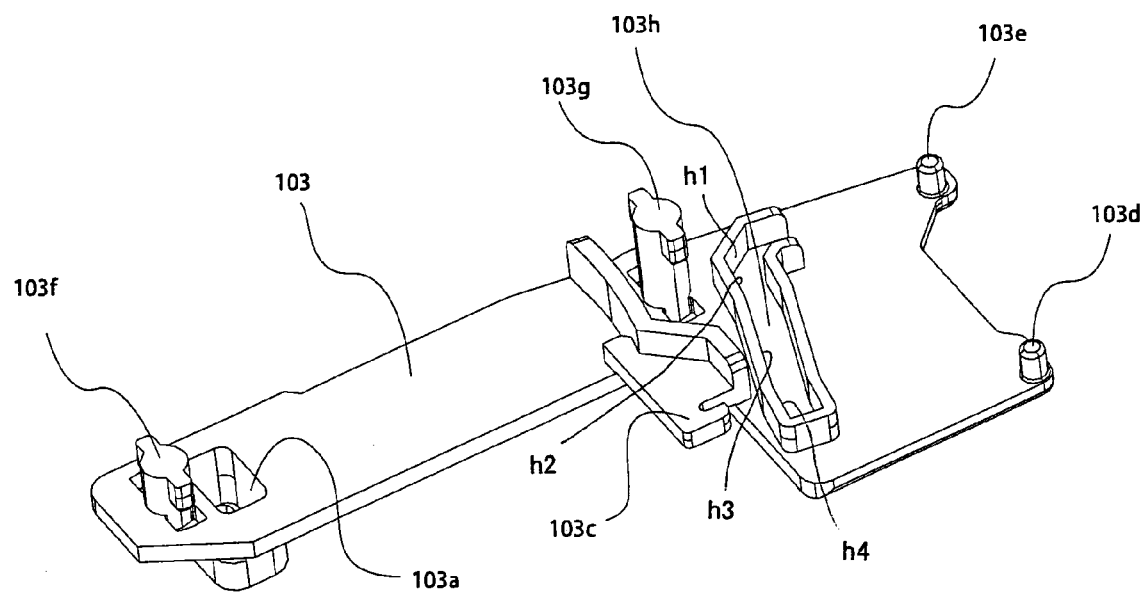
FIG. 8 is a perspective view showing the structure of the link member.

FIG. 4 is a perspective view showing the cam slider 30 as seen from the front surface side (+Z side). FIG. 5 is a perspective view showing a state where the link member 103 is mounted to the main chassis 11, as seen from the back surface side (−Z side). FIG. 6 is a perspective view showing a state where the link member 103 is mounted to the main chassis 11, as seen from the front surface side (+Z side). FIG. 7 is a perspective view showing the link member 103, as seen from the front surface side (+Z side). FIG. 8 is a perspective view showing the link member 103, as seen from the back surface side (−Z side).

As shown in FIGS. 3 and 4, the cam slider 30 is supported at an end portion of the main chassis 11 in the unloading direction (−Y direction) so that the cam slider 30 is reciprocally movable in the X direction. The cam slider 30 includes a first piece 30p having a rectangular shape in plane (shape in XY-plane) and elongated in the X direction, and a second piece 30q extending in the −Z direction from the end portion of the first piece 30p in the Y direction.

The second piece 30q is a plate-like member having a surface parallel to the XZ-plane. A cam groove 30f is formed on the second piece 30q, and the cam groove 30f engages a not shown cam pin of the traverse chassis 51. The cam groove 30f is so formed that the traverse chassis 51 moves upward (shifts in the +Z direction) when the cam slider 30 moves in the +X direction and, and the traverse chassis 51 moves downward (shifts in the −Z direction) when the cam slider 30 moves in the −X direction.

A gear portion 30d extends further in the +X direction from an end of the first piece 30p of the cam slider 30 in the longitudinal direction (+X direction). The gear portion 30d has a rectangular shape in plane and is elongated in the X direction. The width (the dimension in the Y direction) of the gear portion 30d is narrower than the first piece 30p. The gear portion 30d has a rack gear 30a on a side surface facing the +Y direction.

A small-piece portion 30b protrudes horizontally (parallel to the XY-plane) from the end portion in the −Y direction (the end portion opposite to the second piece 30q side) of the cam slider 30. The small-piece portion 30b extends in the +X direction parallel to the gear portion 30d. The small-piece portion 30b contributes to the opening and closing of the flap 20, the detailed description thereof being omitted.

A first guide groove 30m and a second guide groove 30n engageable with the link member 103 are provided on the end portion in the −X direction of the first piece 30p (the end portion opposite to the gear portion 30d and the small-piece portion 30b). The first guide groove 30m and the second guide groove 30n constitute a first engaging portion of the cam slider 30.

The first guide groove 30m includes two adjacent straight portions inclined with respect to each other in plane (in the XY-plane). To be more specific, the first guide groove 30m includes a first guide portion m1 extending at an angle of approximately 45 degrees with respect to the X direction, and a second guide portion m2 approximately in the form of a straight line parallel to the X direction. A first boss 103d (FIG. 7) of the link member 103 described later engages the first guide groove 30m.

The second guide groove 30n includes two adjacent straight portions inclines with respect to each other in plane (in the XY-plane). To be more specific, the second guide groove 30n includes a first guide portion n1 extending at a slight angle with respect to the X direction, and a second guide portion n2 approximately in the form of a straight line parallel to the X direction. A second boss 103e (FIG. 7) of the link member 103 described later engages the second guide groove 30n.

A boss 30k is provided upright in the +Z direction on the end portion of the first piece 30p in the −X direction (the end portion opposite to the gear portion 30d and the small-piece portion 30b). The boss 30k engages a guide groove 103h (FIG. 8) of the link member 103 described later. The boss 30k constitutes a second engaging portion of the cam slider 30.

As shown in FIGS. 5 and 6, the link member 103 is supported at the end portion in the −X direction of the main chassis 11 so that the link member 103 is reciprocally movable in the direction approximately parallel to the Y direction. The link member 103 has a rectangular shape in plane, and is elongated in the Y direction. Bosses 103f and 103g (FIG. 5) protrude in the −Z direction from the vicinities of the respective ends in the +Y direction and the −Y direction of the link member 103.

As shown in FIG. 5, a guide groove 11c is formed on the main chassis 11. The guide groove 11c engages the boss 103f of the link member 103, and extends in the Y direction. Two guide grooves 11d and 11e engageable with the boss 103g of the link member 103 are formed on the main chassis 11. The guide groove 11e extends in the Y direction. The guide groove 11d extends at an angle with respect to the Y direction from the guide groove 11e, and further extends in the Y direction by changing the orientation. The guide grooves 11c, 11d and 11e constitute a guide means for guiding the link member 103.

As shown in FIG. 6, a hook portion 103c extends in the +X direction from the link member 103. A coil spring (a resilient member) 104 is stretched between the hook portion 103c and the boss portion 11b of the main chassis 11. Due to the coil spring 104, the link member 103 is urged in the +Y direction, and also is urged to rotate in a certain direction (the direction in which the boss 103g shifts in the +X direction) about the boss 103f (FIG. 5). Therefore, when the link member 103 is urged in the −Y direction, the boss 103f of the link member 103 is guided by the guide groove 11c of the main chassis 11, and the other boss 103g is guided by the guide groove 11e (not by the guide groove 11d, but by the guide groove 11e disposed on the +X side). As a result, the link member 103 linearly moves in the −Y direction.

As shown in FIG. 7, an opening 103a that opens in the +Z direction is formed in the vicinity of the end portion of the +Y direction of the link member 103. Further, a disk abutting portion 103b protruding in the +Z direction is formed in the vicinity of the end portion in the −Y direction of the link member 103. The disk abutting portion 103b projects into the feeding path of the optical disk so that the disk abutting portion 103b abuts against the optical disk being loaded. The boss portion 102b engages the opening 103a, and the boss portion 102b protrudes in the −Z direction from the stopper arm 102 having been described with reference to FIG. 3. As the stopper arm 102 rotates, the link member 103 moves in the Y direction in association with the stopper arm 102. The disk abutting portion 103b is pushed by the peripheral edge of the optical disk and shifts in the −X direction. If the opening 103a is simultaneously urged in the −Y direction by the stopper arm 102, the boss 103f of the link member 103 is guided by the guide groove 11c of the main chassis 11, and the other boss 103g is guided by the guide groove 11d (not by the guide groove 11e, but by the guide groove 11d disposed on the −X side). As a result, the link member 103 moves in the −Y direction rotating about the boss 103f in the direction in which the disk abutting portion 103b shifts in the −X direction, and then linearly moves in the −Y direction.

As shown in FIG. 8, in the vicinity of the end portion of the link member 103 in the −Y direction, the first boss 103d and the second boss 103e are provided at a certain distance in the X direction. The first boss 103d and the second boss 103e both extend in the −Z direction. The first boss 103d engages the first guide groove 30m (FIG. 4) of the cam slider 30, and the second boss 103e engages the second guide groove 30n (FIG. 4). The first boss 103d and the second boss 103e constitute a first engaging portion of the link member 103.

A guide groove 103h is provided in the vicinity of the end portion of the link member 103 in the −Y direction. The guide groove 103h includes a first guide portion h1 extending at an angle of approximately 45 degrees with respect to the X direction, a second guide portion h2 extending approximately linearly in the X direction, a third guide portion h3 extending at a slight angle with respect to the X direction, and a fourth guide portion h4 further extending approximately linearly in the X direction (on condition that the longitudinal direction of the link member 103 is oriented in the Y direction). The guide groove 103h engages the boss 30k provided upright on the cam slider 30. The guide groove 103h constitutes a second engaging portion of the link member 103.

<Structures of Disk Stopper 101 and Stopper Arm 102>

Figure 9:
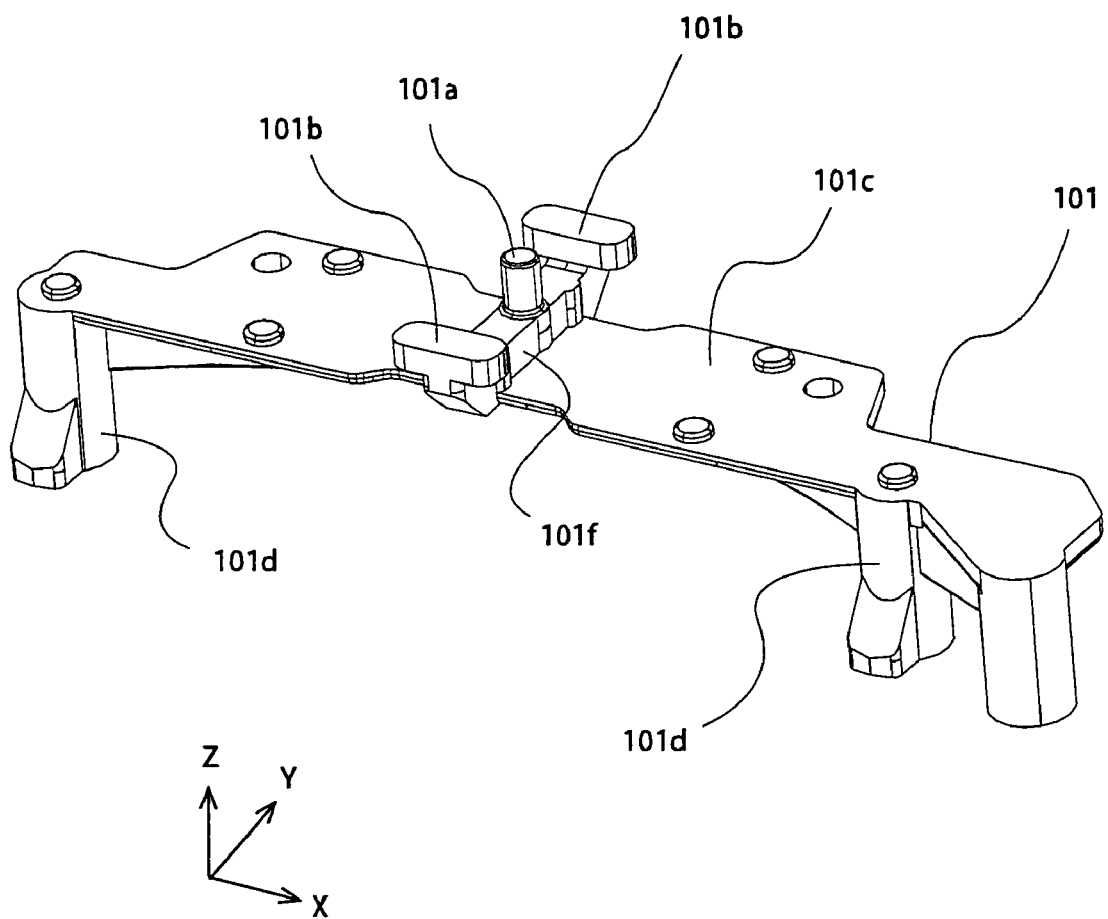
FIG. 9 is a perspective view showing the structure of a disk stopper.
Figure 10:
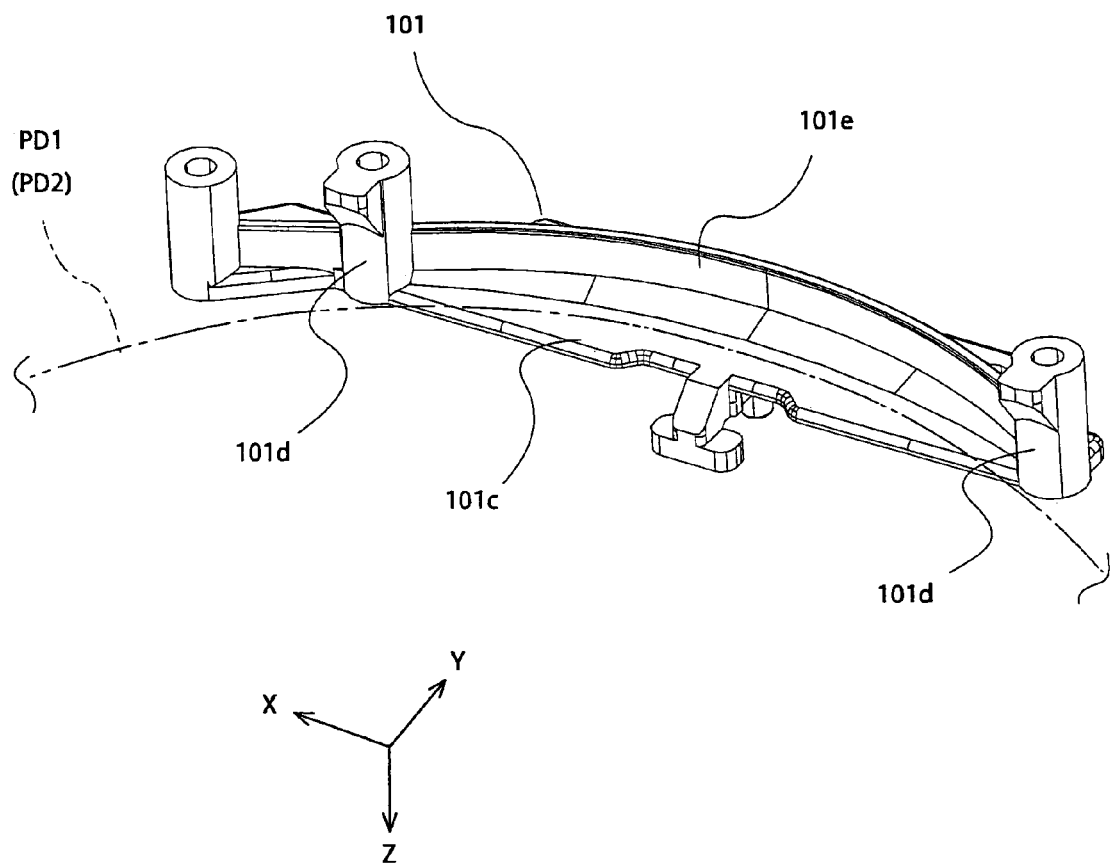
FIG. 10 is a perspective view showing the structure of the disk stopper.

Next, the structures of the disk stopper 101 and the stopper arm 102 will be described. FIG. 9 is a perspective view showing the disk stopper 101 as seen from the front surface side (+Z side). FIG. 10 is a perspective view showing the disk stopper 101 as seen from the back surface side (−Z side).

As shown in FIGS. 9 and 10, the disk stopper 101 includes a top-face plate 101c having a plate surface parallel to the XY-plane and being elongated in the X direction, a side-face plate 101e formed on the −Z side of the top-face plate 101c and extending in an arc along the longitudinal direction of the top-face plate 101c, and two abutting poles 101d protruding in the −Z direction from the back surface of the top-face plate 101c so that the abutting poles 101d contact both end portions of the side-face plate 101e in the longitudinal direction. The abutting pole 101d has a diameter greater than the thickness of the side-face plate 101e, so that the peripheral edge of the optical disk (the optical disk PD1 of 8 cm in diameter, and the optical disk PD2 of 12 cm in diameter) abuts against the abutting poles 101d, but does not directly contact the side-face plate 101e.

In FIG. 10, a dashed-dotted line indicates the optical disk PD1 (PD2) in a state where the disk stopper 101 further moves in the +Y direction after the optical disk PD1 (PD2) abuts against the disk stopper 101. Since the disk stopper 101 is apart from the optical disk PD1 (PD2), the disk stopper 101 does not interfere with the rotation of the optical disk PD1 (PD2).

Further, the boss portion 101a (having been described with reference to FIGS. 1 and 2) is provided upright in the direction of the +Z direction from the center portion (in the X direction) on the upper surface of the top-face plate 101c. The boss portion 101a is disposed on a seat 101f having the width which is almost the same as the groove portion 9f (FIGS. 1 and 2) of the cover chassis 9. The seat 101f slidably engages the groove portion 9f (FIGS. 1 and 2) of the cover chassis 9.

Two guide portions 101b protrude in the +Z direction from both ends of the seat 101f in the Y direction so that the guide portions 101b are disposed on both sides of the boss portion 101a in the Y direction. The guide portion 101b is a member whose width is slightly wider than the width of the groove portion 9g (FIG. 2) of the cover chassis 9. In a state where the seat 101f engages the groove 9f, the guide portions 101b extend across the groove portion 9f in the width direction of the groove portion 9f. With this, the disk stopper 101 is prevented from being dropped out of the groove portion 9f, and the disk stopper 101 is prevented from rotating about the boss 101a.

The initial position of the disk stopper 101 is set in the vicinity of the turntable 52. To be more specific, the initial position of the disk stopper 101 is set in the vicinity (in the −Y direction) of a position for positioning the optical disk PD1 in the loading position (a position where the center of the optical disk PD1 and the center of the turntable 52 are aligned with each other).

Figure 11:
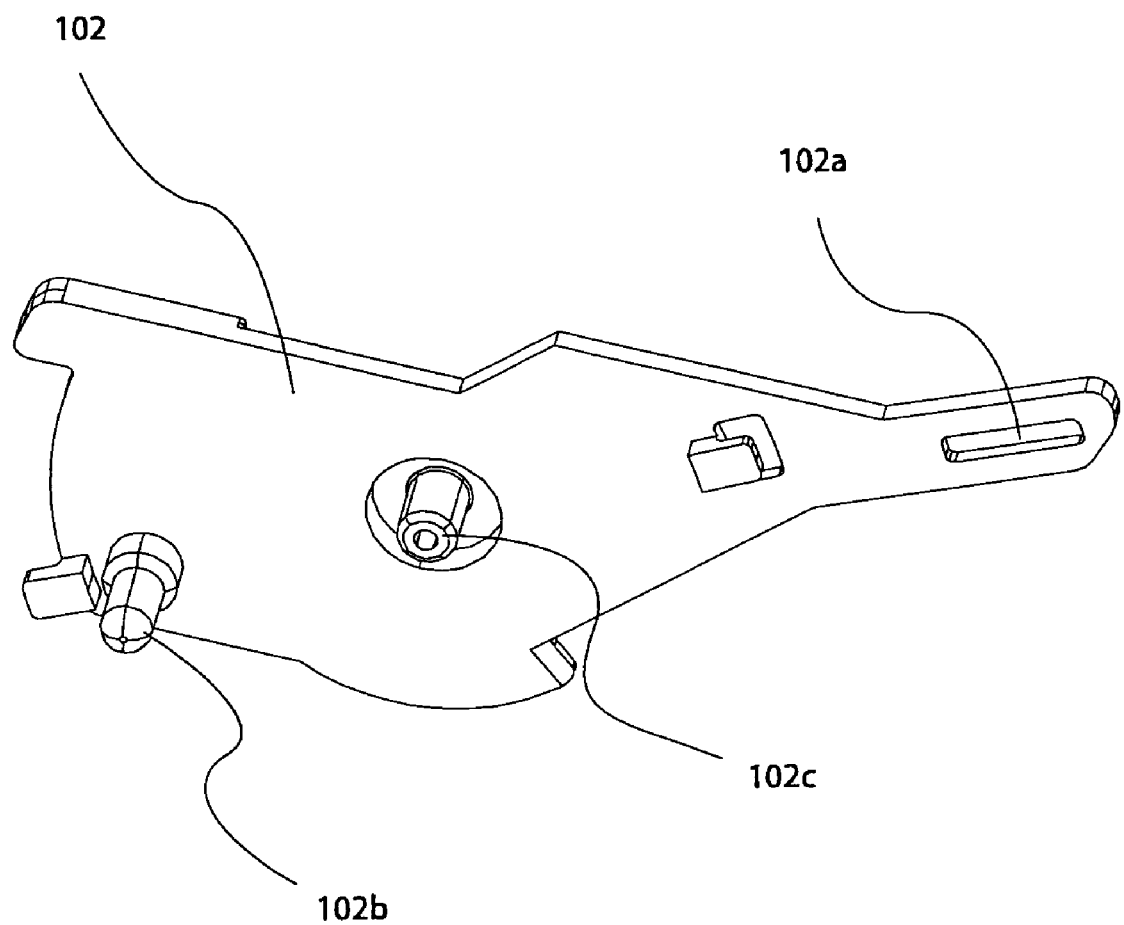
FIG. 11 is a perspective view showing the structure of a stopper arm.
Figure 11:
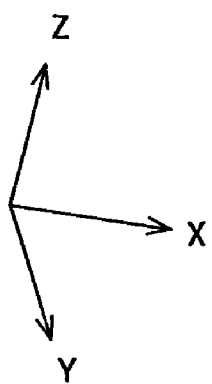

FIG. 11 is a perspective view of the stopper arm 102, as seen from the back side. As shown in FIG. 11, on an end portion of the stopper arm 102 in the longitudinal direction thereof, the slit 102a is formed, which extends in the longitudinal direction of the stopper arm 102. On the other end portion of the stopper arm 102, the boss portion 102b is provided to extend in the −Z direction. A shaft portion 102c defining the rotation center of the stopper arm 102 is provided approximately at the center in the longitudinal direction of the stopper arm 102.

<Loading Operation of Optical Disk of 8 cm>

Figure 12:
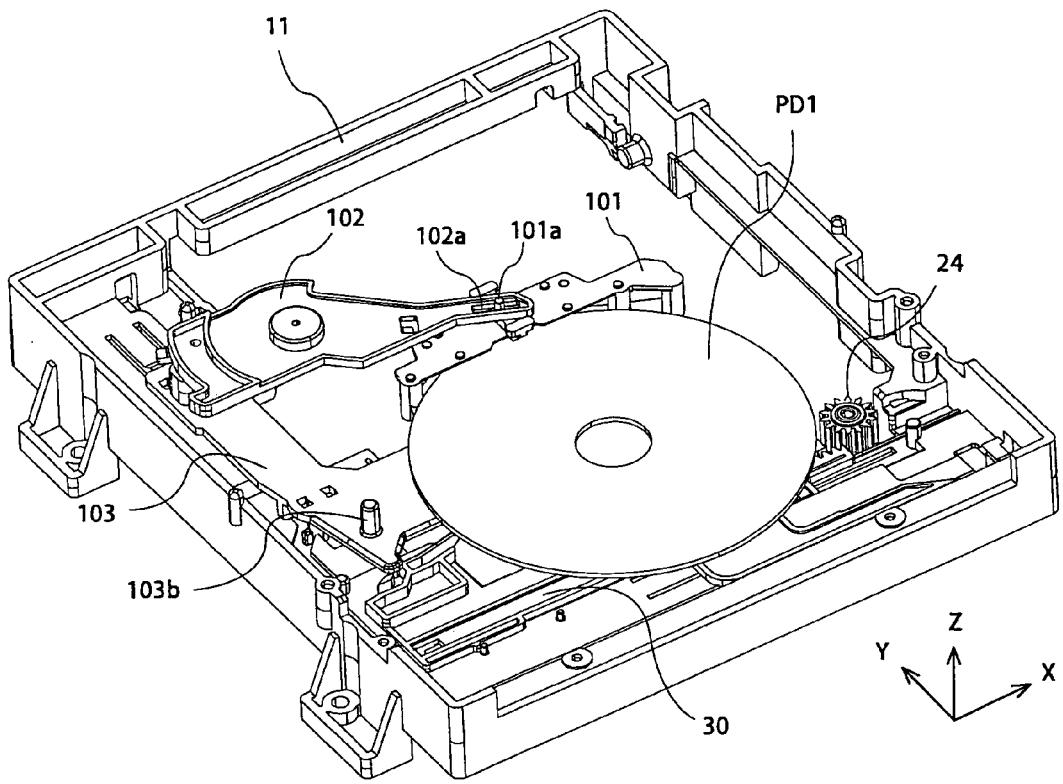
FIGS. 12(*a*) and 12(*b*) are a perspective view showing a state while the optical disk of 8 cm in diameter is being loaded into the disk device according to Embodiment 1 of the present invention, and a perspective view showing a part thereof in an enlarged scale.
Figure 12:
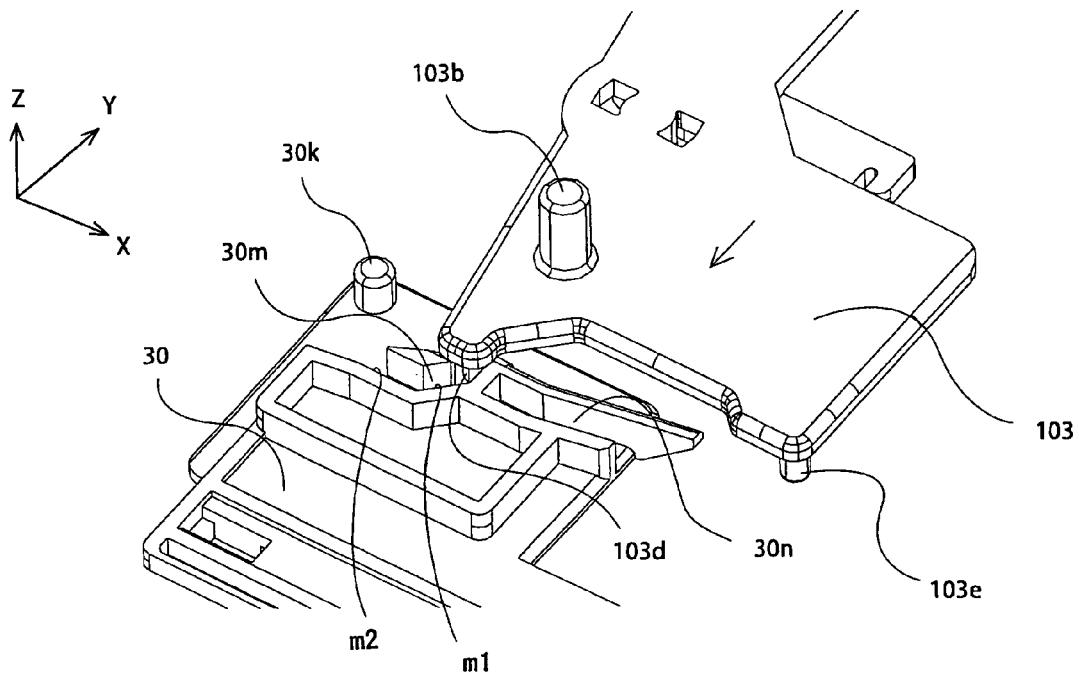
Figure 13:
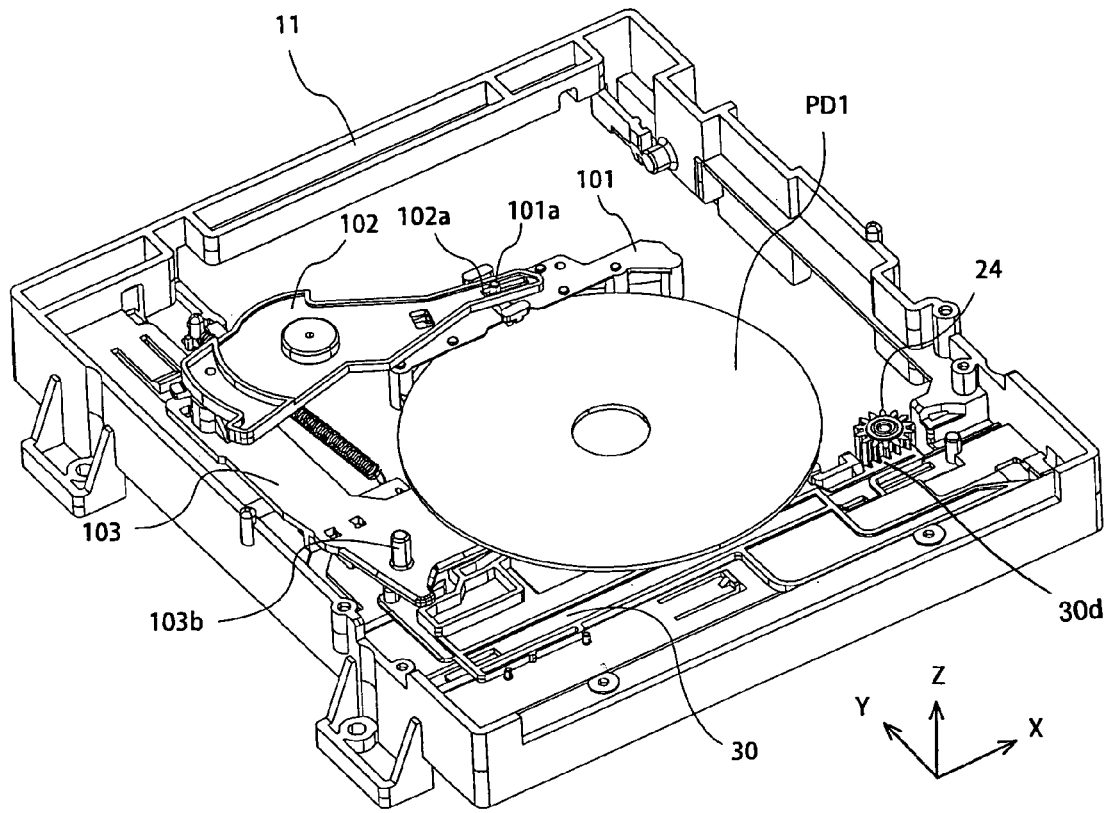
FIGS. 13(*a*) and 13(*b*) are a perspective view showing a state when the optical disk of 8 cm in diameter is loaded into the disk device according to Embodiment 1 of the present invention, and a perspective view showing a part thereof in an enlarged scale.
Figure 13:
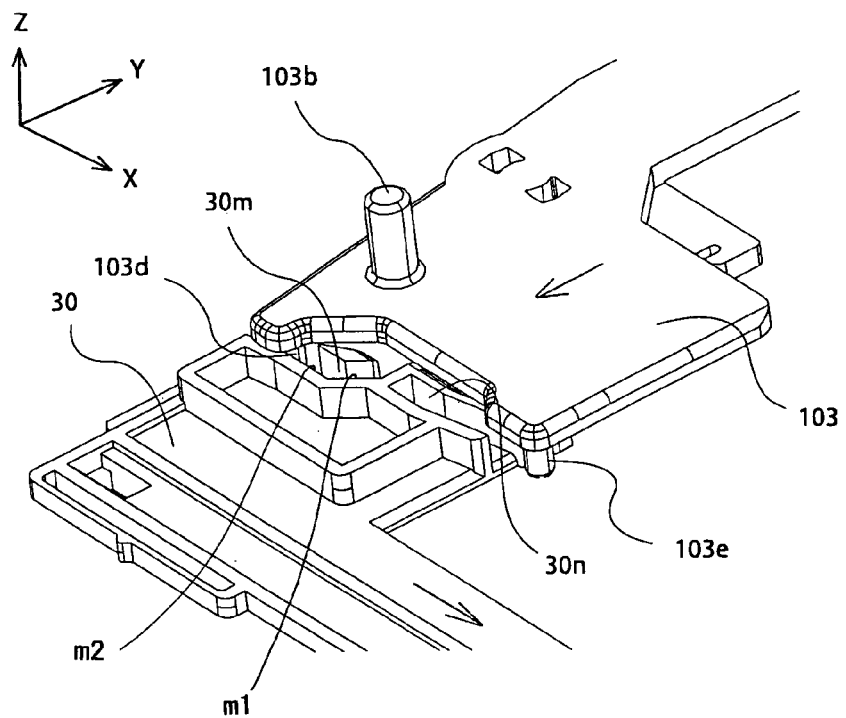
Figure 14:
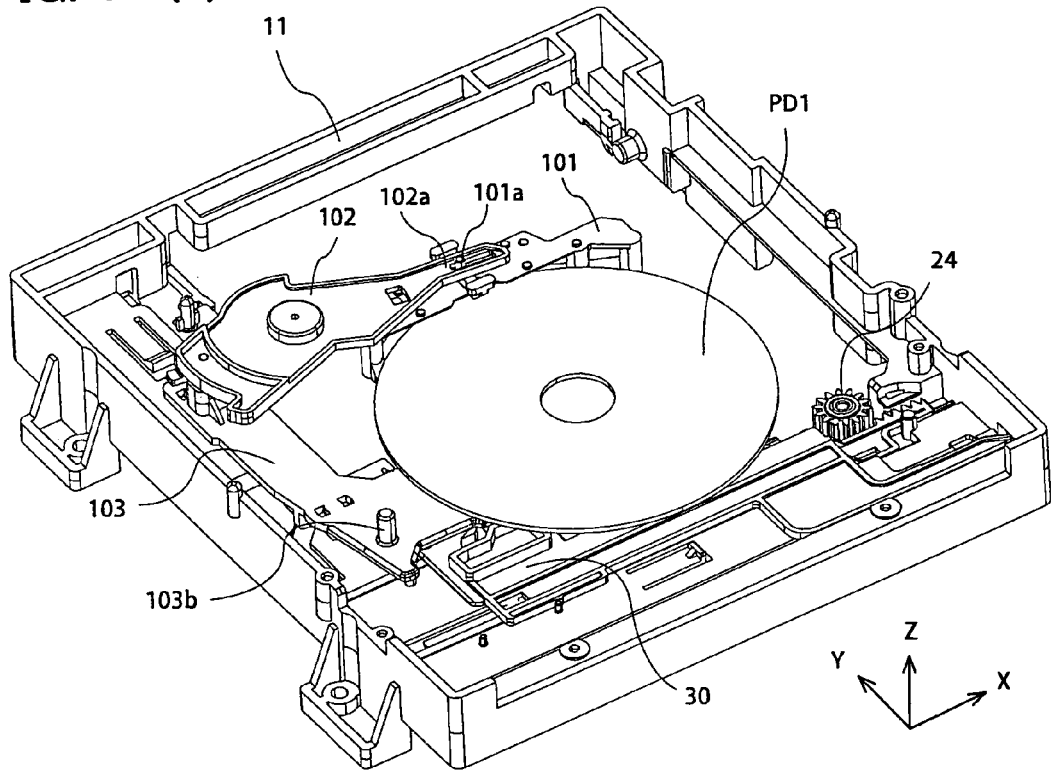
FIGS. 14(*a*) and 14(*b*) are a perspective view showing a state after the optical disk of 8 cm in diameter is loaded into the disk device according to Embodiment 1 of the present invention, and a perspective view showing a part thereof in an enlarged scale.
Figure 14:
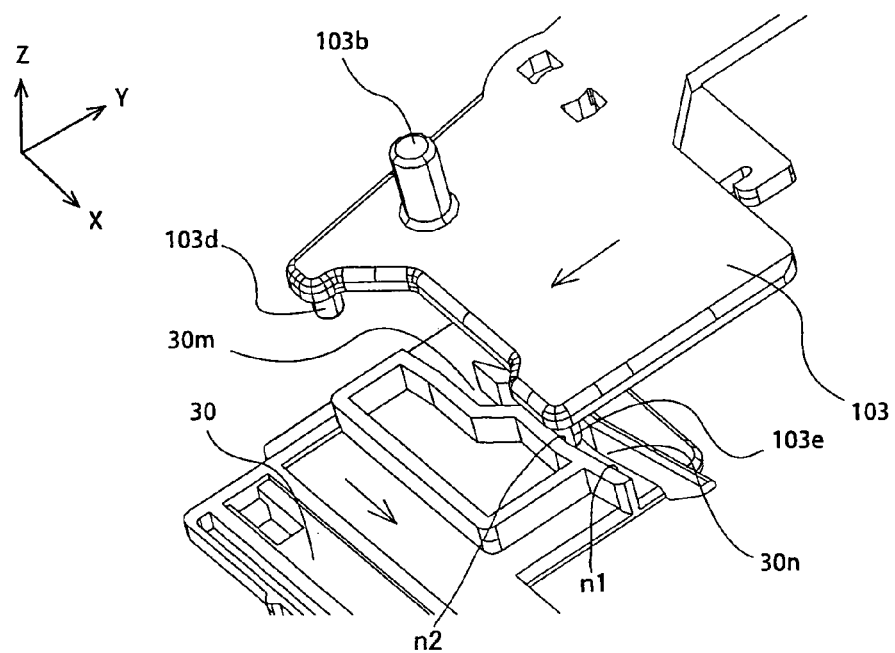

Next, the loading operation of the optical disk PD1 of 8 cm in diameter will be described with reference to FIGS. 12, 13 and 14.

FIG. 12(a) is a perspective view showing a state immediately after the optical disk PD1 is loaded into the disk device 1 by the feeding roller 21 (FIG. 3) and the peripheral edge of the optical disk PD1 abuts against the disk stopper 101. In FIG. 12(a) and FIGS. 13(a) and 14(a) described later, the cover chassis 9 and other components in remote relation to the disk stopper 101 are omitted. FIG. 12(b) is a perspective view showing the positional relationship between the link member 103 and the cam slider 30 in a state shown in FIG. 12(a).

As shown in FIG. 12(a), immediately after the optical disk PD1 abuts against the disk stopper 101, the turntable 52 (FIG. 3) is still in the lowermost position. Further, as shown in FIG. 12(b), the link member 103 and the cam slider 30 do not engage each other.

FIG. 13(a) is a perspective view showing a state where the disk stopper 101 is further pushed in the loading direction (+Y direction) from the state shown in FIG. 12(a) so that the center of the turntable 52 (FIG. 3) and the center of the optical disk PD1 are almost aligned with each other. FIG. 13(b) is a perspective view showing the positional relationship between the link member 103 and the cam slider 30 in a state shown in FIG. 13(a).

As shown in FIG. 13(a), when the disk stopper 101 is further pushed in the loading direction (+Y direction), the link member 103 slides in the −Y direction in association with the stopper arm 102. Further, with the sliding of the link member 103 in the −Y direction, the cam slider 30 slightly moves in the +X direction, with the result that the gear portion 30d of the cam slider 30 reaches the driving gear 24 and engage the driving gear 24. Next, the cam slider 30 moves in the +X direction by the rotational driving force of the driving gear 24. With this, the traverse chassis 51 swings in the +Z direction about the rotation shafts 51a and 51b (FIG. 3) by means of the engagement between the cam groove 30f (FIG. 4) of the cam slider 30 and a not shown cam pin (FIG. 3) of the traverse chassis 51. With this, the turntable 52 (FIG. 3) approaches the clamper 18 (FIG. 1).

This operation will be further described in detail with reference to FIG. 13(b). When the link member 103 slides in the −Y direction, the first boss 103d of the link member 103 engages the first guide groove 30m of the cam slider 30. When the first boss 103d engages the first guide portion m1 of the first guide groove 30m, the cam slider 30 moves in the +X direction due to the inclination of the first guide portion m1. As a result, the gear portion 30d of the cam slider 30 engages the driving gear 24 (FIG. 3). By rotating the driving gear 24 from this state, the cam slider 30 further moves in the +X direction, and the first boss 103d engages the second guide portion m2 of the first guide groove 30m. Since the second guide portion m2 extends in the X direction, the movement of the link member 103 in the −Y direction is prevented, so that the position of the disk stopper 101 is regulated. In this state, the state where the center of the turntable 52 is aligned with the center of the optical disk PD1 is held. Therefore, the operation for moving the turntable 52 upward by swinging the traverse chassis 51 to thereby hold the optical disk PD1 is surely performed.

FIG. 14(a) is a perspective view showing a state where the turntable 52 (FIG. 3) moves completely upward so that the clamper 18 (FIG. 1) and the turntable 52 hold the optical disk PD1 therebetween. FIG. 14(b) is a perspective view showing the positional relationship between the link member 103 and the cam slider 30 in a state shown in FIG. 14(a).

In a state shown in FIG. 14(a), the cam slider 30 further moves in the +X direction by the rotational driving force of the driving gear 24 (FIG. 3), and the disk stopper 101 further moves in the loading direction (+Y direction). With this, the disk stopper 101 moves away from the optical disk PD1, so that the disk stopper 101 is prevented from interfering with the optical disk PD1 when the optical disk PD1 rotates.

This operation is further described in detail with reference to FIG. 14(b). When the cam slider 30 further moves in the +X direction, the first boss 103d of the link member 103 moves out of the first guide groove 30m of the cam slider 30, and the second boss 103e of the link member 103 engages the second guide groove 30n of the cam slider 30. When the second boss 103e engages the first guide portion n1 of the second guide groove 30n, the link member 103 slides in the −Y direction dye to the inclination of the first guide portion n1, so as to cause the disk stopper 101 (via the stopper arm 102) to slightly move in the loading direction (+Y direction). Thereafter, the second boss 103e engages the second guide groove n2 of the second guide groove 30n, and the movement of the disk stopper 101 is completed, so that the position of the disk stopper 101 is regulated. With this, the disk stopper 101 stops at a position remote from the optical disk PD1.

Here, as the first engaging portion of the cam slider 30, the first guide groove 30m and the second guide groove 30n are separately provided. However, it is also possible to constitute the second guide groove 30n to be connected to the first guide groove 30m in the −X direction so that the first boss 103d of the link member 103 continuously engages the first guide groove 30m and the second guide groove 30n. In this case, the second boss 103e can be eliminated. However, in this case, the second guide groove 30n extends in the −X direction out of the cam slider 30, and therefore the dimension of the disk device in the X direction may increase. In other words, since the first guide groove 30m and the second guide groove 30n are separately provided as described above so that the first guide groove 30m and the second guide groove 30n engage the first boss 103d and the second boss 103e of the link member 103, the dimension of the cam slider 30 in the X direction can be small. As a result, it becomes possible to obtain the disk device whose dimension in the X direction is small.

<Loading Operation of Optical Disk of 12 cm>

Figure 15:
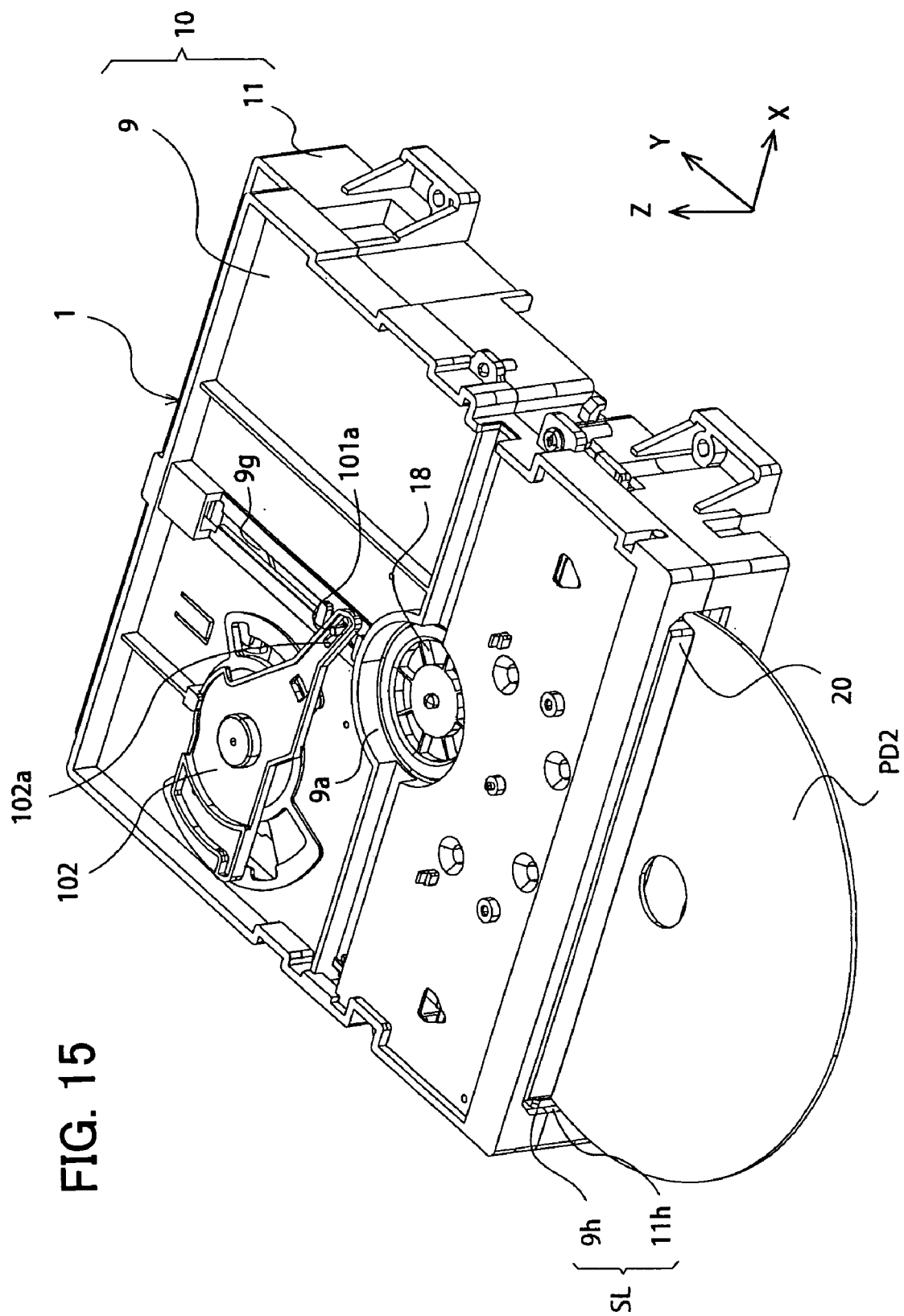
FIG. 15 is a perspective view showing a state when an optical disk of 12 cm in diameter is being loaded into the disk device.
Figure 16:
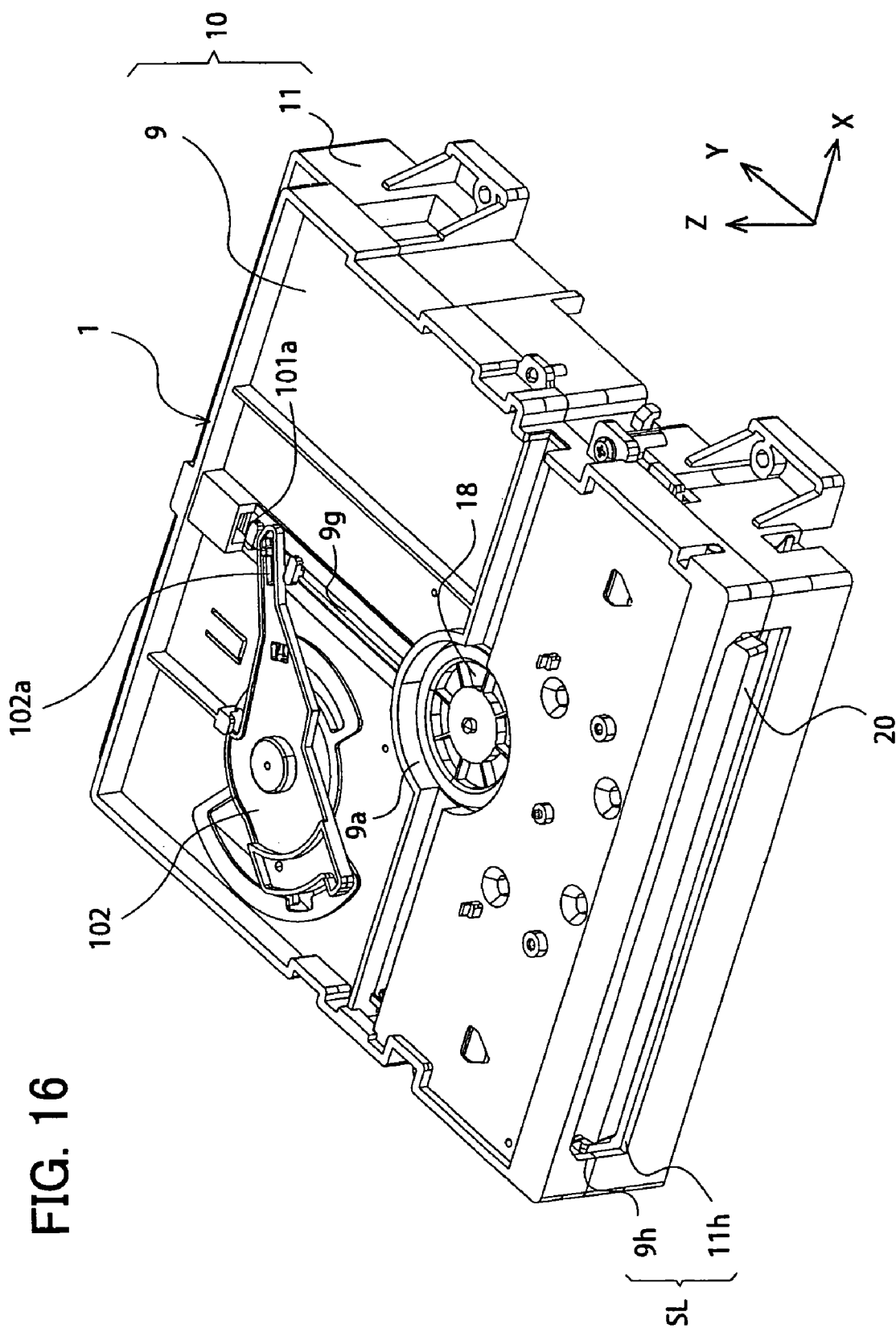
FIG. 16 is a perspective view showing a state where the optical disk of 12 cm in diameter is loaded into the disk device.
Figure 17:
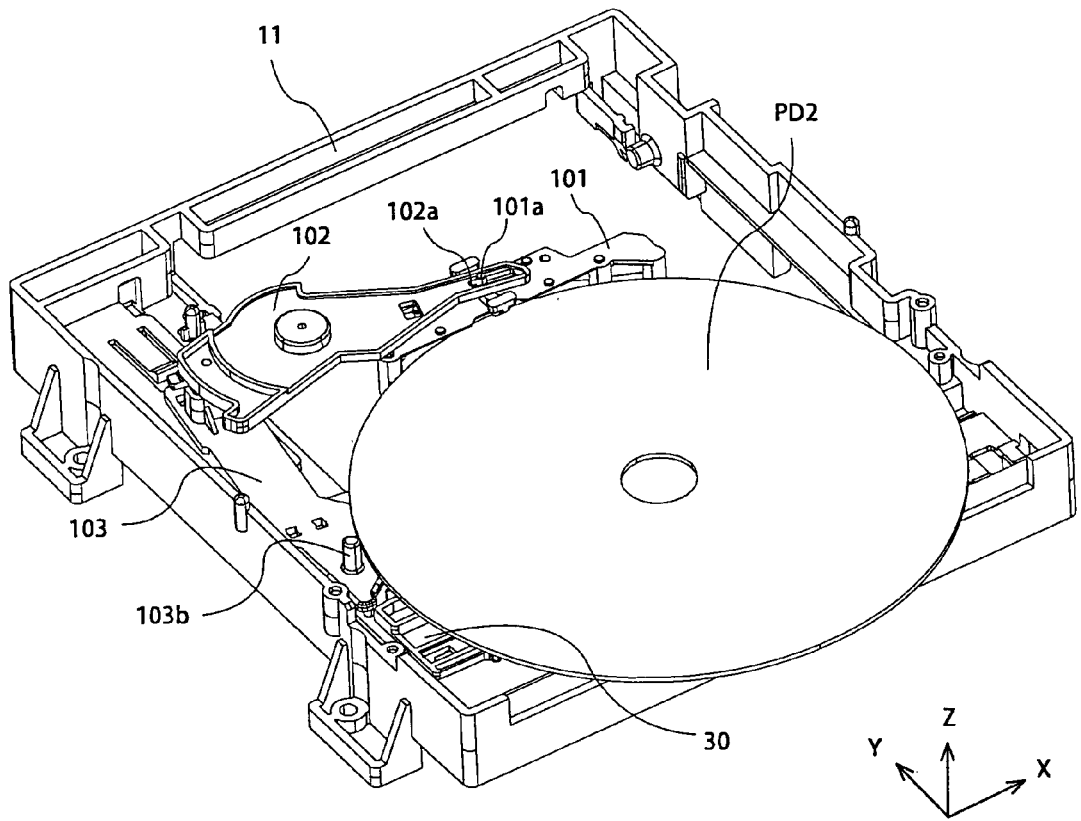
FIGS. 17(a) and 17(b) are a perspective view showing a state while the optical disk of 12 cm in diameter is being loaded into the disk device according to Embodiment 1 of the present invention, and a perspective view showing a part thereof in an enlarged scale.
Figure 17:
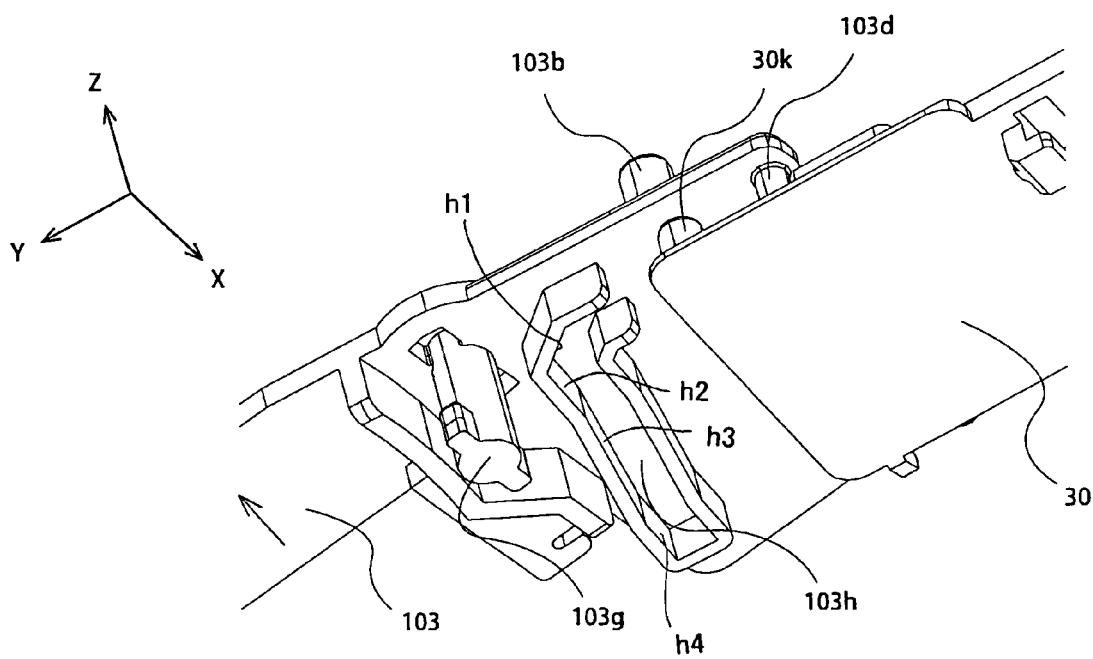
Figure 18:
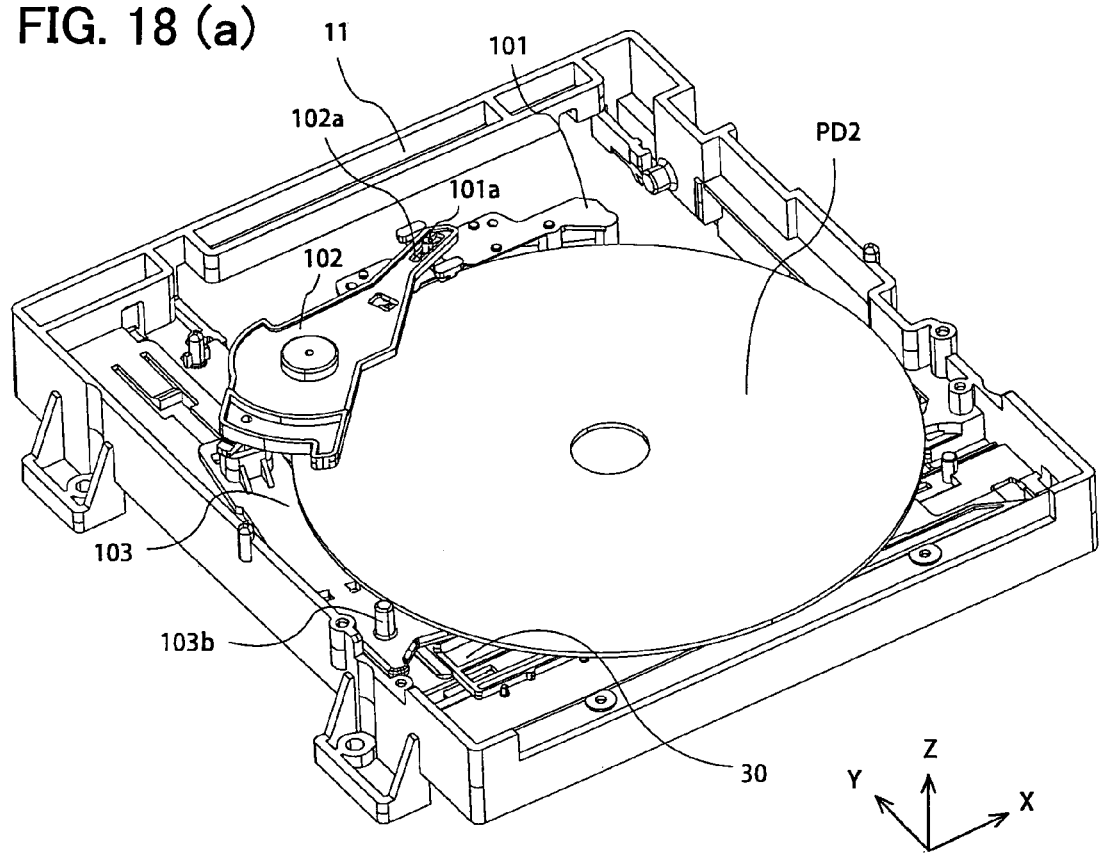
FIGS. 18(a) and 18(b) are a perspective view showing a state where the optical disk of 12 cm in diameter is loaded into the disk device according to Embodiment 1 of the present invention, and a perspective view showing a part thereof in an enlarged scale.
Figure 18:
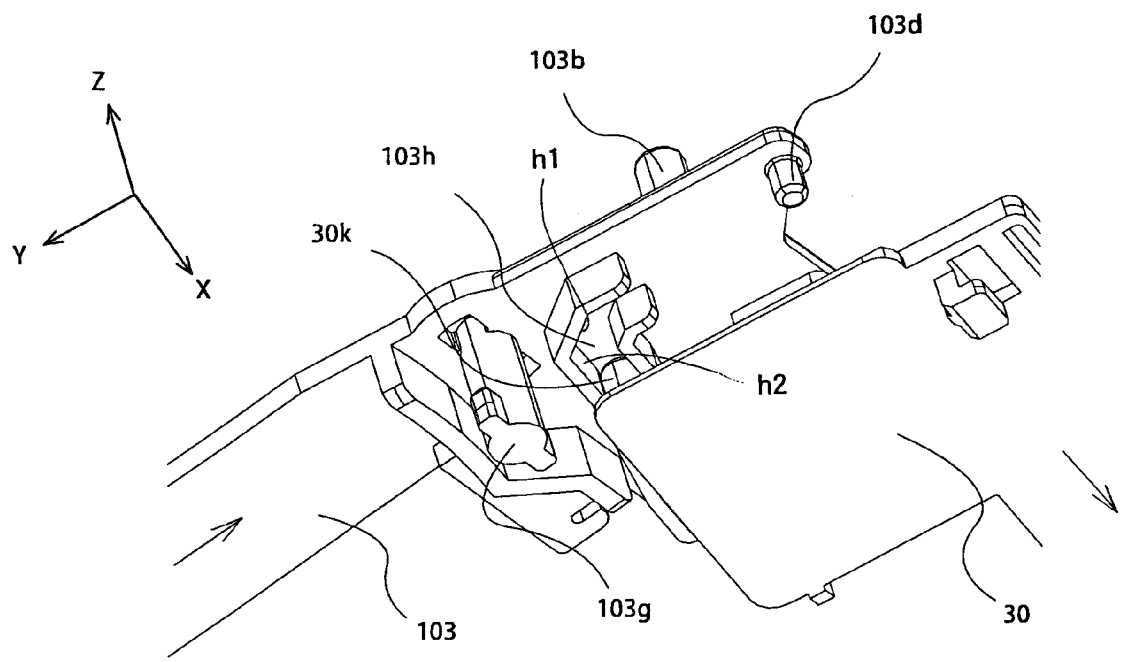
Figure 19:
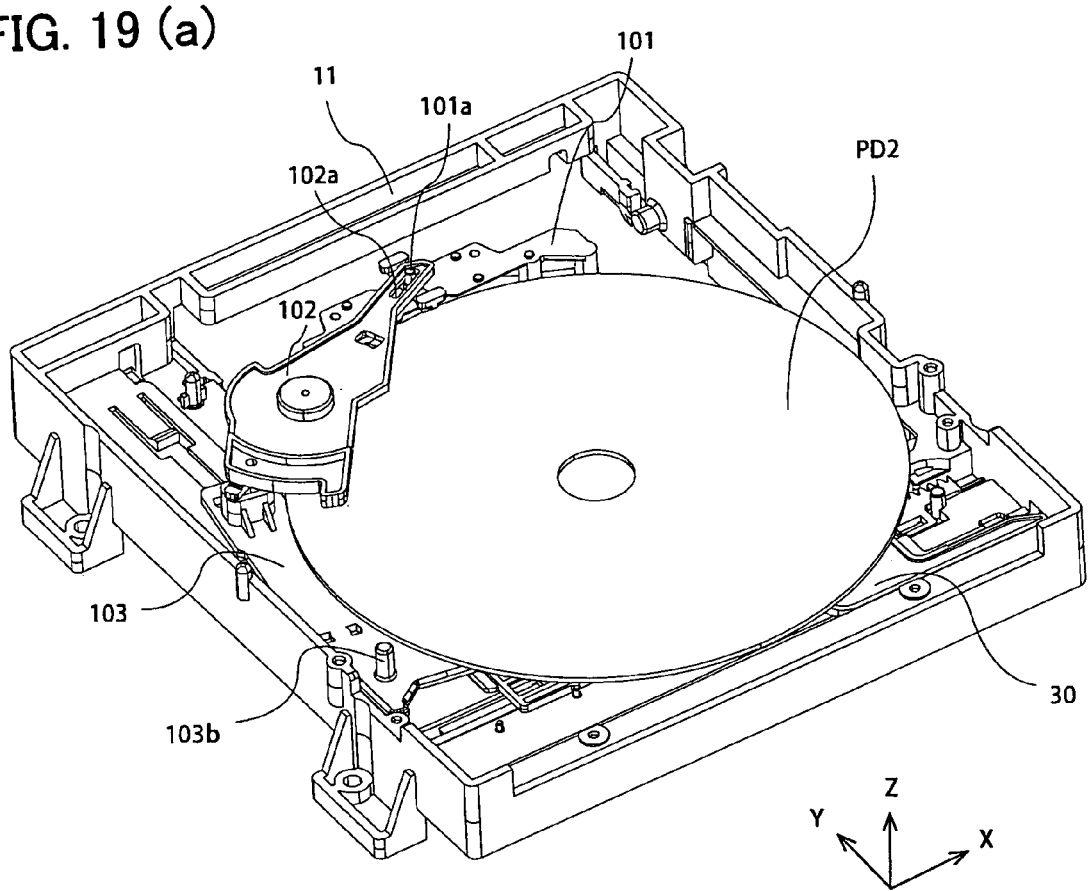
FIGS. 19(a) and 19(b) are a perspective view showing a state after the optical disk of 12 cm in diameter is loaded into the disk device according to Embodiment 1 of the present invention, and a perspective view showing a part thereof in an enlarged scale.
Figure 19:
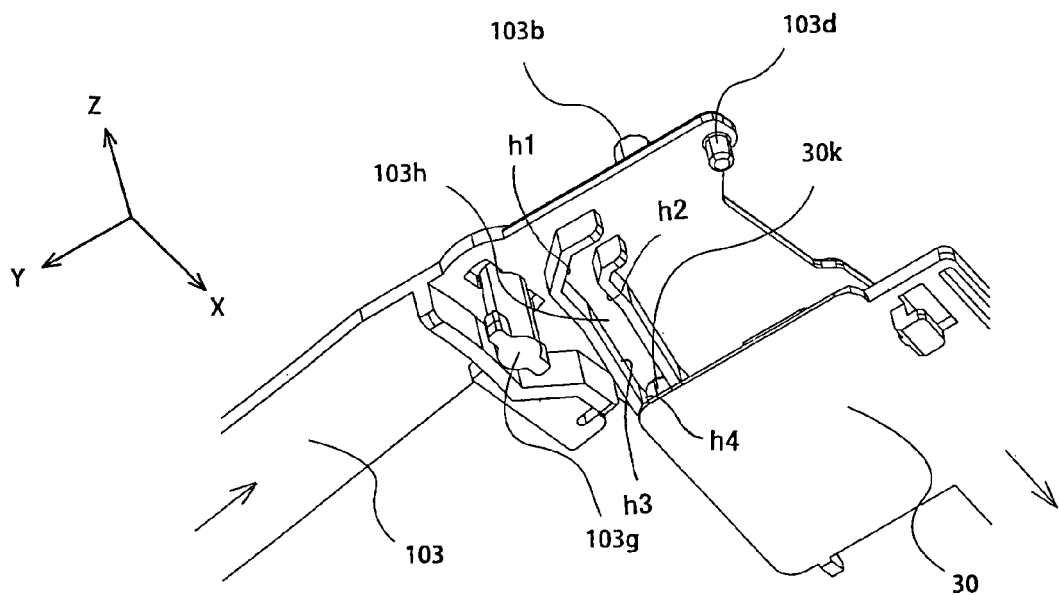

FIG. 15 is a perspective view showing a state before the optical disk PD2 of 12 cm in diameter is loaded into the disk device 1. FIG. 16 is a perspective view showing a state after the optical disk PD2 of 12 cm in diameter is loaded into the disk device 1.

In a state shown in FIG. 15, the optical disk PD2 is not loaded into the disk device 1, and the disk stopper 101 is in the initial position. As shown in FIG. 16, when the optical disk PD2 is loaded into the disk device 1, (as can be understood from the position of the boss portion 101a) the disk stopper 101 is pushed by the optical disk PD2 and moves in the +Y direction (the loading direction), and the disk stopper 101 moves further in the +Y direction beyond the loading position of the optical disk PD1 of 8 cm. The operation of the disk device 1 shown in FIGS. 15 and 16 will be further described with reference to FIGS. 17 through 19.

FIG. 17(a) is a perspective view showing a state immediately after the optical disk PD2 is loaded into the disk device 1 by the feeding roller 21 (FIG. 3) and the peripheral edge of the optical disk PD2 abuts against the disk stopper 101. In FIG. 17(a) and FIGS. 18(a) and 19(a) described later, the cover chassis 9 and other components in remote relation to the disk stopper 101 are omitted. FIG. 17(b) is a perspective view showing the positional relationship between the link member 103 and the cam slider 30 in a state shown in FIG. 17(a).

As described above, the stopper arm 102 normally operates only in the range corresponding to the optical disk PD1 of 8 cm in diameter, and can not move beyond this range. However, in the case where the optical disk PD2 of 12 cm in diameter is loaded into the disk device 1, it is necessary to move the disk stopper 101 further in the +Y direction compared with the case in which the optical disk PD1 of 8 cm is loaded. The structure for that purpose is the disk abutting portion 103b provided on the link member 103.

As described above, the disk abutting portion 103b extends in the +Z direction from an end portion of the link member 103 in the –Y direction (the end portion closer to the disk insertion/ejection opening SL), and has a sufficient length so that the peripheral edge of the loaded optical disk PD2 contacts the disk abutting portion 103b. The initial position of the disk abutting portion 103b in the horizontal plane (the XY-plane) is so set that the disk abutting portion 103b contacts the peripheral edge of the optical disk PD2 when the optical disk PD2 of 12 cm is loaded, but does not contact the peripheral edge of the optical disk PD1 when the optical disk PD1 of 8 cm is loaded.

In a state where a half or more of the optical disk PD2 is loaded in the disk device 1 as shown in FIG. 17(a), the peripheral edge of the optical disk PD2 abuts against the disk stopper 101 and also abuts against the disk abutting portion 103b.

The link member 103 is rotatable about the boss 103f only when the disk stopper 101 is in the initial position. This is because the boss 103g of the link member 103 shown in FIG. 5 is able to selectively move into one of the guide grooves 11d and 11e in a state where the disk stopper 101 is in the initial position. As the disk abutting portion 103b is pushed by the peripheral edge of the optical disk PD2, the link member 103 shifts (rotates) in the –X direction, and the boss 103g is guided by the guide groove 11d (the guide groove for the 12 cm disk) to move in the –Y direction.

In a state shown in FIG. 17(b), the guide groove 103h of the link member 103 and the boss 30k of the cam slider 30 do not engage each other. However, when the link member 103 is pushed by the peripheral edge of the optical disk PD2 and moves in the –X direction, the guide groove 103h of the link member 103 reaches the position (in the X direction) where the guide groove 103h is engageable with the boss 30k of the cam slider 30. Therefore, when the link member 103 linearly moves further in the –Y direction, the boss 30k and the guide groove 103h engage each other. Between the state shown in FIG. 17(b) and the state where the boss 30k and the guide groove 103h engage each other, the optical disk PD2 further moves in the +Y direction, and the link member 103 moves in the –Y direction.

FIG. 18(a) is a perspective view showing a state where the optical disk PD2 further pushes the disk stopper 101 further in the +Y direction (after the optical disk PD2 abuts against the disk stopper 101) so that the center of the turntable 52 and the center of the optical disk PD2 are aligned with each other. In a state shown in FIG. 18(a), the link member 103 moves in the –Y direction in association with the stopper arm 102, and the cam slider 30 moves in the +X direction by the engagement of the link member 103 and the cam slider 30.

By the movement of the cam slider 30 in the +X direction, the gear portion 30d of the cam slider 30 engages the driving gear 24 (FIG. 3), and the cam slider 30 moves in the +X direction by the rotational driving force of the driving gear 24. By the movement of the cam slider 30 in the X direction, the traverse chassis 51 swings in the +Z direction, so that the turntable 52 (FIG. 3) approaches the clamper 18 (FIG. 1).

This operation will be further described in detail with reference to FIG. 18(b). When the link member 103 slides in the –Y direction, the boss 30k of the cam slider 30 engages the first guide portion h1 of the guide groove 103h of the link member 103. With this, the cam slider 30 slightly moves in the +X direction. As a result, the gear portion 30d (FIG. 4) of the cam slider 30 engages the driving gear 24 (FIG. 3). The cam slider 30 further moves in the +X direction by the rotational driving force of the driving gear 24, and the second guide portion h2 of the guide groove 103h and the boss 30k engage each other. With this, the movement of the link member 103 in the –Y direction is prevented, so that the position of the disk stopper 101 is regulated. In this state, the state where the center of the turntable 52 is aligned with the center of the optical disk PD1 is held. Therefore, the operation for moving the turntable 52 upward by swinging the traverse chassis 51 to thereby hold the optical disk PD1 is surely performed.

FIG. 19(a) is a perspective view showing a state where the turntable 52 (FIG. 3) moves completely upward so that the clamper 18 (FIG. 1) and the turntable 52 hold the optical disk PD2 therebetween. FIG. 19(b) is a perspective view showing the positional relationship between the link member 103 and the cam slider 30 in a state shown in FIG. 19(a).

In a state shown in FIG. 19(a), the cam slider 30 further moves in the +X direction by the rotational driving force of the driving gear 24 (FIG. 3), and the disk stopper 101 further moves in the +Y direction. With this, optical disk PD2 departs from the disk stopper 101, so that the disk stopper 101 is prevented from interfering with the optical disk PD2 when the optical disk PD2 rotates.

This operation is further described in detail with reference to FIG. 19(b). When the cam slider 30 further moves in the +X direction, the third guide portion h3 of the guide groove 103h and the boss 30k of the cam slider 30 engage each other. Due to the inclination of the third guide portion h3 of the guide groove 103h, the link member 103 slides in the –Y direction, and the disk stopper 101 move in the +Y direction (loading direction) in association with the link member 103. Thereafter, the boss 30k of the cam slider 30 engages the fourth guide portion h4 of the guide groove 103h, and the movement of the disk stopper 101 is completed, so that the position of the disk stopper 101 is regulated. With this, the disk stopper 101 departs from the optical disk PD2.

In this embodiment, the second engaging portion of the link member 103 (for positioning the optical disk PD2 of 12 cm) is configured as the guide groove 103h, and the second engaging portion of the cam slider 30 is configured as the boss 30k. In contrast, it is also possible that the second engaging portion of the link member 103 is configured as a boss, and the second engaging portion of the cam slider 30 is configured as a guide groove. However, in this case, the guide groove extends in the –X direction out of the cam slider 30, and therefore the dimension of the disk device in the X direction may increase. In this embodiment, the second engaging portion of the link member 103 is configured as the guide groove 103h, and the second engaging portion of the cam slider 30 is configured as the boss 30k, with the result that the dimension of the cam slider 30 in the X direction can be small. As a result, it becomes possible to obtain the disk device whose dimension in the X direction is small.

As described above, the disk device according to this embodiment is so configured that the engaging position between the link member 103 and the cam slider 30 is switched according to the diameter of the optical disk, based on which the movable range of the disk stopper 101 in the Y direction is switched. Therefore, the positioning of the optical disks having different diameters in the Y direction (the loading-unloading direction) can be automatically performed.

Particular, according to the diameter of the optical disk, the first engaging portion of the link member 103 (the first boss 103d and the second boss 103e) and the first engaging portion of the cam slider 30 (first guide groove 30m and the second guide groove 30n) engage each other, or the second engaging portion of the link member 103 (the guide groove 103h) and the second engaging portion of the cam slider 30 (the boss 30k) engage each other. Therefore, it becomes possible to simplify the structure, and accordingly it becomes possible to prevent the occurrence of a defect due to the complexity of the structure.

Furthermore, after the positioning of the disk medium in the loading position is completed, the disk stopper 101 is retracted to a position where the disk stopper 101 does not abut against the disk medium. Therefore, the disk stopper 101 is prevented from interfering with the rotating disk medium.

Further, the coil spring 104 urges the link member 103 in the +Y direction so that the disk stopper 101 ejects the optical disk, it becomes possible to cause the link member 103, the stopper arm 102 and the disk stopper 101 to return to their initial positions after the ejection of the disk medium.

Furthermore, when the disk abutting portion 103b is pushed by the disk medium of 12 cm, the link member 103 is obliquely guided by the guide groove 11d, and therefore it becomes possible to cause the boss 30k of the cam slider 30 to engage the guide groove 103h of the link member 103 when the disk medium of 12 cm is inserted. Therefore, the switching can be performed with a simple structure.

The cam slider 30 has a region where the cam slider 30 is moved by the engagement with the link member 103, and a region where the cam slider 30 is moved by the power transmitted by the driving gear 24. Therefore, the disk stopper 101 can be moved using a driving source for vertically moving the traverse unit 51.

Embodiment 2

Embodiment 2 of the present invention relates to another configuration example of the link member 103 and cam slider 30, and the other components are the same as those of Embodiment 1.

Figure 20:
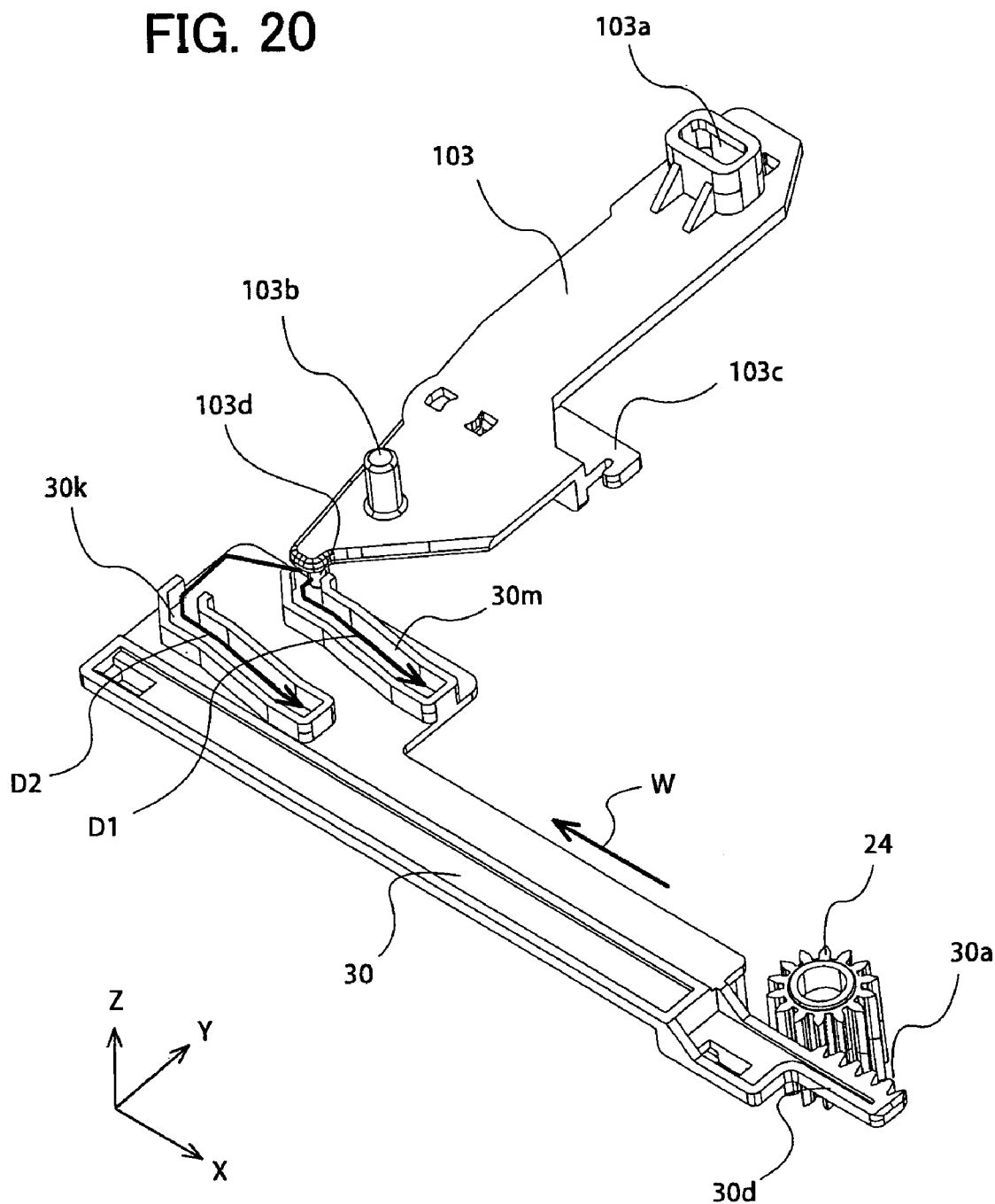
FIG. 20 is a perspective view showing the structure and the operation of a link member and a cam slider according to Embodiment 2 of the present invention.

FIG. 20 is a perspective view showing the link member 103 and the cam slider 30 according to this embodiment. In the above described Embodiment 1, the cam slider 30 moves in the +X direction to move the turntable 52 upward. In this embodiment, the cam slider 30 moves in the –X direction to move the turntable 52 upward.

Only a boss 103d as an engaging portion is provided on the back surface of the link member 103. The second boss 103e and the guide groove 103h (FIG. 8) having been described in Embodiment 1 are not provided. A first guide groove 30m (a first engaging portion) and a second guide groove 30K (a second engaging portion) are formed on the cam slider 30. In the case where the optical disk PD1 of 8 cm is to be positioned (in the case where the optical disk does not push the disk abutting portion 103b), the boss 103d of the link member 103 engages the first guide groove 30m of the cam slider 30, and moves on a track D1. In the case where the optical disk PD2 of 12 cm is to be positioned (in the case where the optical disk pushes the disk abutting portion 103b), the boss 103d of the link member 103 engages the guide groove 30k of the cam slider 30, and moves on a track D2.

Inclined portions of the first and second guide grooves 30m and 30k are so inclined that the movement of the link member 103 in the –Y direction causes the cam slider 30 to move in the –X direction (the direction of an arrow W). For that purpose, the gear portion 30d of the link member 103 is initially disposed on the +X side with respect to the driving gear 24.

As described above, in this embodiment, as in Embodiment 1, the positioning of the optical disks of different diameters in the Y direction can be automatically performed with a simple structure.

In addition, in this embodiment, the common member (the boss 103d) of the link member 103 engages the first guide groove 30m (the first engaging portion) and the second guide groove 30k (the second engaging portion), and therefore the structure of the link member 103 can be simplified.

In the above described Embodiments 1 and 2, although two types of the optical disks of different diameters are selectively positioned, it is also possible to selectively position three or more types of the optical disks. Further, the object to be positioned only needs to be a disk medium (disk-like information medium).

The invention claimed is:

1. A disk loading mechanism comprising:
a feeding mechanism capable of loading and unloading disk media of different diameters into and from a disk device;
a turntable that holds and rotates said disk medium loaded by said feeding mechanism;
a cam slider for moving said turntable between a position where said turntable is able to hold said disk medium and a position apart from said disk medium;
a driving mechanism for driving said cam slider;
a disk stopper provided to be movable in a loading-unloading direction of said disk medium, said disk stopper regulating a loading position of said disk medium by abutting against said disk medium;
a stopper regulating member that regulates a movable range of said disk stopper, and
a link member movable in association with said stopper regulating member and having first and second engaging portions,
wherein said link member has a disk abutting portion pushed by a disk medium of a predetermined diameter, and is shiftable in a direction different from said loading-unloading direction when said disk abutting portion is pushed by said disk medium;
wherein said cam slider has a first engaging portion that engages said first engaging portion of said link member in a state where said disk abutting portion is not pushed, and a second engaging portion that engages said second engaging portion of said link member in a state where said disk abutting portion is pushed;

wherein said first engaging portion of said cam slider and said first engaging portion of said link member are configured to engage each other thereby regulating said link member at a first position in said loading-unloading direction during the movement of said cam slider, so as to cause said stopper regulating member to regulate said disk stopper at a predetermined position in said loading-unloading direction, and wherein said second engaging portion of said cam slider and said second engaging portion of said link member are configured to engage each other thereby regulating said link member at a second position in said loading-unloading direction during the movement of said cam slider, so as to cause said stopper regulating member to regulate said disk stopper at a position shifted in a loading direction from said predetermined position.

2. The disk loading mechanism according to claim 1, wherein one of said first engaging portion of said cam slider and said first engaging portion of said link member is a guide groove including a groove portion extending parallel to a moving direction of said cam slider, and wherein the other of said first engaging portion of said cam slider and said first engaging portion of said link member is a to-be-guided member guided by said guide groove.

3. The disk loading mechanism according to claim 1, wherein one of said second engaging portion of said cam slider and said second engaging portion of said link member is a guide groove including a groove portion extending parallel to a moving direction of said cam slider, and wherein the other of said second engaging portion of said cam slider and said second engaging portion of said link member is a to-be-guided member guided by said guide groove.

4. The disk loading mechanism according to claim 2, wherein said guide groove further includes a groove portion inclined with respect to said movable direction of said cam slider, and wherein, after said cam slider moves said turntable to a position where said turntable is able to hold said disk medium, said disk stopper departs from said disk medium by the engagement between said to-be-guided portion and said inclined groove portion of said guide groove.

5. The disk loading mechanism according to claim 1, further comprising a resilient member that urges said link member so that said disk stopper is urged in an unloading direction.

6. The disk loading mechanism according to claim 1, wherein said first engaging portion and said second engaging portion of said link member are a common member.

7. The disk loading mechanism according to claim 1, wherein said cam slider is movable in a direction approximately perpendicular to said loading-unloading direction, and wherein said cam slider is moved by the engagement with said link member in a first region, and said cam slider is moved by said driving mechanism in a second region.

8. The disk loading mechanism according to claim 1, wherein said first engaging portion of said link member comprises two to-be-guided members;

wherein said first engaging portion of said cam slider comprises two guide grooves respectively engaging said two to-be-guided members, and wherein, after one guide groove and one to-be-guided member engage each other, the other guide groove and the other to-be-guided member engages each other.

9. A disk device comprising said disk loading mechanism according to claim 1.

* * * * *